US008094714B2

(12) United States Patent
Nakazato et al.

(10) Patent No.: US 8,094,714 B2
(45) Date of Patent: Jan. 10, 2012

(54) SPECULATIVE START POINT SELECTION FOR MOTION ESTIMATION ITERATIVE SEARCH

(75) Inventors: Munehiro Nakazato, Sunnyvale, CA (US); Sung-Yul Koo, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 846 days.

(21) Appl. No.: 12/218,656

(22) Filed: Jul. 16, 2008

(65) Prior Publication Data

US 2010/0014588 A1 Jan. 21, 2010

(51) Int. Cl.
*H04N 7/12* (2006.01)

(52) U.S. Cl. ............... 375/240.01; 375/240.16

(58) Field of Classification Search .............. None
See application file for complete search history.

(56) References Cited

U.S. PATENT DOCUMENTS

| 5,317,685 | A | | 5/1994 | Morimura et al. | |
|---|---|---|---|---|---|
| 5,717,470 | A | | 2/1998 | Jung | 348/699 |
| 6,014,181 | A | * | 1/2000 | Sun | 348/699 |
| 6,081,551 | A | | 6/2000 | Etoh | |
| 6,181,382 | B1 | | 1/2001 | Kieu et al. | |
| 6,278,736 | B1 | | 8/2001 | De Haan et al. | |
| 6,295,367 | B1 | | 9/2001 | Crabtree et al. | |
| 6,360,022 | B1 | | 3/2002 | Lubin et al. | |
| 6,658,059 | B1 | | 12/2003 | Iu et al. | |
| 6,842,483 | B1 | | 1/2005 | Au et al. | |
| 7,170,562 | B2 | | 1/2007 | Yoo et al. | |
| 7,170,934 | B2 | | 1/2007 | Linzer | 375/240 |
| 7,187,810 | B2 | | 3/2007 | Clune et al. | |
| 7,224,731 | B2 | | 5/2007 | Mehrotra | |
| 7,260,148 | B2 | | 8/2007 | Sohm | 375/240.16 |
| 7,457,435 | B2 | | 11/2008 | Pace | |
| 7,751,482 | B1 | | 7/2010 | Srinivasan et al. | |
| 7,801,218 | B2 | | 9/2010 | Olivier et al. | |
| 7,860,160 | B2 | * | 12/2010 | Shimazaki et al. | 375/240.03 |
| 2003/0152279 | A1 | | 8/2003 | Ohtani et al. | |
| 2004/0070686 | A1 | | 4/2004 | Jung et al. | |
| 2004/0075749 | A1 | | 4/2004 | Kondo et al. | |
| 2004/0114688 | A1 | * | 6/2004 | Kang | 375/240.12 |
| 2004/0247029 | A1 | * | 12/2004 | Zhong et al. | 375/240.16 |
| 2005/0105618 | A1 | | 5/2005 | Booth et al. | 375/240.16 |

(Continued)

OTHER PUBLICATIONS

Su et al., "Robust Global Motion Estimation From Coarsely Sampled Motion Vector Fields"; Image and Video Communications and Processing 2003, Published Jun. 30, 2003, pp. 98-101, vol. 5022, Proceedings of SPIE—IS&T Electronic Imaging.

(Continued)

*Primary Examiner* — Hong Cho

(74) *Attorney, Agent, or Firm* — Haverstock & Owens LLP

(57) ABSTRACT

A speculative start point selection for motion estimation iterative search improves the efficiency and quality of the integer-pel motion estimation iterative search by speculatively selecting the start position of the iteration. The start position is selected by comparing the Sum of Absolute Differences (SAD) value of a 0 motion vector, a predicted motion vector and a global motion vector (GMV) and selecting the position with the smallest SAD value. A refinement scheme with a threshold improves the efficiency and quality of the motion estimation iterative search by performing several comparisons to ensure the proper motion vector is selected. Applications of this improved motion estimation search include stabilizing an image as well as many other applications where motion vectors are used.

81 Claims, 21 Drawing Sheets

U.S. PATENT DOCUMENTS

| | | |
|---|---|---|
| 2005/0134745 A1 | 6/2005 | Bacche et al. |
| 2005/0135484 A1 | 6/2005 | Lee et al. ............. 375/240.16 |
| 2005/0201626 A1 | 9/2005 | Kang et al. |
| 2005/0276327 A1 | 12/2005 | Lee et al. ............. 375/240.16 |
| 2006/0023119 A1 | 2/2006 | Han |
| 2006/0056513 A1 | 3/2006 | Shen et al. ............. 375/240.16 |
| 2006/0056708 A1 | 3/2006 | Shen et al. ............. 382/232 |
| 2006/0280248 A1 | 12/2006 | Kim et al. |
| 2007/0009038 A1* | 1/2007 | Kim et al. ............. 375/240.16 |
| 2007/0092006 A1 | 4/2007 | Malayath ............. 375/240.16 |
| 2007/0121728 A1 | 5/2007 | Wang et al. ............. 375/240.18 |
| 2007/0154103 A1 | 7/2007 | Au et al. ............. 382/236 |
| 2007/0183504 A1 | 8/2007 | Hoffman et al. ......... 375/240.16 |
| 2007/0217515 A1 | 9/2007 | Wang et al. ............. 375/240.17 |
| 2007/0286286 A1 | 12/2007 | Heng et al. ............. 375/240.16 |
| 2007/0297512 A1 | 12/2007 | Lee et al. ............. 375/240.16 |
| 2008/0002774 A1* | 1/2008 | Hoshino et al. ......... 375/240.16 |
| 2008/0037647 A1* | 2/2008 | Stojancic et al. ......... 375/240.17 |
| 2008/0123743 A1* | 5/2008 | Douniwa et al. ......... 375/240.15 |
| 2008/0219348 A1* | 9/2008 | Sugimoto et al. ........ 375/240.12 |

OTHER PUBLICATIONS

Hideki Yamauchi et al., "An 81MHz, 1280 X 720pixels×30frames/s MPEG-4 Video-Audio Codec Processor", 2005, ISSCC 2005/ Session 7/ Multimedia Processing/ 7.2, pp. 97-130-131-589, SANYO Electric, Gifu, Japan.

Hye-Yeon Cheong Tourapis et al., Fast Motion Estimation Within The H.264 CODEC, 2003, pp. III-517-III-520, IEEE, Corporate Research, Thomas multimedia Inc., 2 Independence Way, Princeton, NJ 08540, U.S.A.

Gagan B. Rath et al., "Iterative Least Squares and Compression Based Estimations for a Four-Parameter Linear Global Motion Compensation", IEEE Transactions on circuits and systems for video technology, vol. 9, No. 7, pp. 1075-1099, Department of Electrical Communication Engineering, Indian Institute of Science, Bangalore-560012, India, Publisher Item Identifier S 1051-8215(99)08175-6.

Yang et al., "On Incorporating Just-Noticeable-Distrotion Progile Into Motion-Compensated Prediction for Video", Image Processing, 2003, ICIP2003, International Conference, vol. 3, pp. III-833-6 vol. 2, Sep. 14-17, 2003.

* cited by examiner

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |

Fig. 12

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |

SPECULATIVE START POINT SELECTION FOR MOTION ESTIMATION ITERATIVE SEARCH

FIELD OF THE INVENTION

The present invention relates to the field of video compression. More specifically, the present invention relates to improved motion estimation in digital video encoders.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bitstream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

One of the most time-consuming components within the encoding process is motion estimation. Motion estimation is utilized to reduce the bit rate of video signals by implementing motion compensated prediction in combination with transform coding of the prediction error. Motion estimation-related aliasing is not able to be avoided by using inter-pixel motion estimation, and the aliasing deteriorates the prediction efficiency. In order to solve the deterioration problem, half-pixel interpolation and quarter-pixel interpolation are adapted for reducing the impact of aliasing. To estimate a motion vector with quarter-pixel accuracy, a three step search is generally used. In the first step, motion estimation is applied within a specified search range to each integer pixel to find the best match. Then, in the second step, eight half-pixel points around the selected integer-pixel motion vector are examined to find the best half-pixel matching point. Finally, in the third step, eight quarter-pixel points around the selected half-pixel motion vector are examined, and the best matching point is selected as the final motion vector. Considering the complexity of the motion estimation, the integer-pixel motion estimation takes a major portion of motion estimation if a full-search is used for integer-pixel motion estimation. However, if a fast integer motion estimation algorithm is utilized, an integer-pixel motion vector is able to be found by examining less than ten search points. As a consequence, the computation complexity of searching the half-pixel motion vector and quarter-pixel motion vector becomes dominant.

SUMMARY OF THE INVENTION

A speculative start point selection for motion estimation iterative search improves the efficiency and quality of the integer-pel motion estimation iterative search by speculatively selecting the start position of the iteration. The start position is selected by comparing the Sum of Absolute Differences (SAD) value of a 0 motion vector, a predicted motion vector and a global motion vector (GMV) and selecting the position with the smallest SAD value. A refinement scheme with a threshold improves the efficiency and quality of the motion estimation iterative search by performing several comparisons to ensure the proper motion vector is selected. Applications of this improved motion estimation search include stabilizing an image as well as many other applications where motion vectors are used.

In one aspect, a method of refining an iterative search result for motion estimation using a computing device comprises determining a starting position comprising computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to a smallest distance value of the smallest distance position to form a total cost, comparing the total cost with a predictive motion vector distance value to determine a smaller value and selecting the smaller value of the total cost and the predictive motion vector distance value. In some embodiments, the distance value is a Sum of Absolute Differences value. The plurality of positions includes a first position, a second position and a third position. The first position is a zero (0) motion vector, the second position is a predicted motion vector and the third position is a global motion vector. The motion vector cost is calculated based on the distance from a predicted motion vector. The smaller value is further refined and stabilizes an image. Iteratively searching further comprises setting a count to a specified value, computing a sub-region distance value of a sub-region, selecting a smallest regional distance value in the sub-region, comparing the smallest regional distance value with a previous smallest regional distance, retaining a smaller regional distance value of the smallest regional distance value and the previous smallest regional distance value, decrementing the count and repeating the steps until the count is zero. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In another aspect, a system for refining an iterative search result for motion estimation comprises a memory for storing an application, the application is configured for determining a starting position comprising computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to a smallest distance value of the smallest distance position to form a total cost, comparing the total cost with a predictive motion vector distance value to determine a smaller value and selecting the smaller value of the total cost and the predictive motion vector distance value and a processor for processing the application. In some embodiments, the distance value is a Sum of Absolute Differences value. The plurality of positions includes a first position, a second position and a third position. The first position is a zero (0) motion vector, the second position is a predicted motion vector and the third position is a global motion vector. The motion vector cost is calculated based on the distance from a predicted motion vector. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. The smaller value is further refined and used to stabilize an image. The processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In another aspect, an application for refining an iterative search result for motion estimation processed by a processor comprises a starting position component for determining a smallest starting position for starting an iterative search, an iterative search component for iteratively searching for a smallest distance position and a comparison component for comparing a total cost with a predicted motion vector distance value, wherein the total cost includes a smallest distance value of the smallest distance position and a motion vector cost. Determining a smallest starting position includes computing a distance value for each of a plurality of positions, comparing the distance value of each of the plurality of positions and selecting a smallest starting distance position from the distance value of each of the plurality of positions. The plurality of positions includes a first position, a second position and a third position. The first position is a zero (0) motion vector, the second position is a predicted motion vector and the third position is a global motion vector. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. The motion vector cost is calculated based on the distance from a predicted motion vector. The best distance position is used to determine an appropriate motion vector which is used to stabilize an image. The application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In yet another aspect, a method of refining an iterative search result for motion estimation using a computing device comprises determining a starting position comprising computing distance value for each of a plurality of positions, comparing the distance value of each of the plurality of positions and selecting a smallest starting distance position from the distance value of each of the plurality of positions iteratively searching for a smallest distance position starting from the starting position, adding a motion vector cost to a smallest distance value of the smallest distance position to form a total cost, determining if a global motion vector is less than a threshold, if the global motion vector is less than the threshold, additional steps are taken, including comparing the total cost with a predictive motion vector distance value to determine a smaller value and selecting the smaller value of the total cost and the predictive motion vector distance value for refinement and if the global motion vector is greater than or equal to the threshold, the smallest distance value of the smallest distance position is selected for refinement. In some embodiments, the distance value is a Sum of Absolute Differences value. The plurality of positions includes a first position, a second position and a third position. The first position is a zero (0) motion vector, the second position is a predicted motion vector and the third position is a global motion vector. The motion vector cost is calculated based on the distance from a predicted motion vector. The method stabilizes an image. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In another aspect, a system for refining an iterative search result for motion estimation comprises a memory for storing an application, the application is configured for determining a starting position comprising computing distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to a smallest distance value of the smallest distance position to form a total cost, determining if a global motion vector is less than a threshold, if the global motion vector is less than the threshold, additional steps are taken, including comparing the total cost with a predictive motion vector distance value to determine a smaller value and selecting the smaller value of the total cost and the predictive motion vector distance value for refinement and if the global motion vector is greater than or equal to the threshold, the smallest distance value of the smallest distance position is selected for refinement and a processor for processing the application. In some embodiments, the distance value is a Sum of Absolute Differences value. The plurality of positions includes a first position, a second position and a third position. The first position is a zero (0) motion vector, the second position is a predicted motion vector and the third position is a global motion vector. The motion vector cost is calculated based on the distance from a predicted motion vector. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. The system stabilizes an image. The processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In another aspect, an application for refining an iterative search result for motion estimation processed by a processor comprises a starting position component for determining a smallest starting position for starting an iterative search, an iterative search component for iteratively searching for a smallest distance position, a comparison component for comparing a total cost with a predicted motion vector distance value, wherein the total cost includes a smallest distance value of the smallest distance position and a motion vector cost and a threshold component for comparing a global motion vector with a threshold to determine whether to execute the comparison component or to use a result from the iterative search component. Determining a smallest starting position includes computing a distance value for each of a plurality of positions, comparing the distance value of each of the plurality of positions and selecting a smallest starting distance position from the distance value of each of the plurality of positions. In some embodiments, the distance value is a Sum of Absolute Differences value. The plurality of positions includes a first position, a second position and a third position. The first position is a zero (0) motion vector, the second position is a predicted motion vector and the third position is a global motion vector. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. The motion vector cost is calculated based on the distance from a predicted motion vector. The application stabilizes an image. The application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

In yet another aspect, a method of selecting a starting position for a motion estimation iterative search using a computing device comprises computing a distance value for each of a plurality of positions, comparing the distance value of each of the plurality of positions and selecting a smallest starting distance position from the distance value of each of the plurality of positions. In some embodiments, the distance value is a Sum of Absolute Differences value. The plurality of positions includes a first position, a second position and a third position. The first position is a zero (0) motion vector, the second position is a predicted motion vector and the third position is a global motion vector. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system. The smallest starting distance position is used as the starting position for the motion estimation iterative search which stabilizes an image.

In another aspect, a method of estimating motion using a computing device comprises determining a starting position which comprises computing a distance value for each of a plurality of positions, comparing the distance value, of each of the plurality of positions and selecting a smallest starting distance position from the distance value of each of the plurality of positions and iteratively searching for a smallest distance position starting from the starting position. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. In some embodiments, the distance value is a Sum of Absolute Differences value. The plurality of positions includes a first position, a second position and a third position. The first position is a zero (0) motion vector, the second position is a predicted motion vector and the third position is a global motion vector. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system. The smallest distance position is used to determine an appropriate motion vector which is used to stabilize an image.

In another aspect, a system for estimating motion comprises a memory for storing an application, the application configured for determining a starting position comprising, computing a distance value for each of a plurality of positions, comparing the distance value of each of the plurality of positions and selecting a smallest starting distance position from the distance value of each of the plurality of positions and iteratively searching for a smallest distance position starting from the starting position and a processor for processing the application. Iteratively searching further comprises setting a count to a specified value, computing a sub-region distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. In some embodiments, the distance value is a Sum of Absolute Differences value. The plurality of positions includes a first position, a second position and a third position. The first position is a zero (0) motion vector, the second position is a predicted motion vector and the third position is a global motion vector. The processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system. The smallest distance position is used to determine an appropriate motion vector which is used to stabilize an image.

In another aspect, an application for estimating motion processed by a processor comprises a starting position component for determining a best starting position for starting an iterative search and an iterative search component for iteratively searching for a smallest distance position. Iteratively searching further comprises setting a count to a specified value, computing a distance value of a sub-region, selecting a smallest regional distance value in the sub-region, comparing the smallest regional distance value with a previous smallest regional distance value, retaining a smaller regional distance value of the smallest regional distance value and the previous smallest regional distance value, decrementing the count and repeating the steps until the count is zero. Determining the best starting position includes computing a distance value for each of a plurality of positions, comparing the distance value of each of the plurality of positions and selecting a smallest starting distance position from the distance value of each of the plurality of positions. The plurality of positions includes a first position, a second position and a third position. The first position is a zero (0) motion vector, the second position is a predicted motion vector and the third position is a global motion vector. The application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system. The smallest distance position is used to determine an appropriate motion vector which is used to stabilize an image.

In yet another aspect, a method of improving motion estimation using a computing device comprises determining a starting position comprising computing a distance value for each of a plurality of positions, comparing the distance value of each of the plurality of positions and selecting a smallest starting distance position from the distance value of each of the plurality of positions, iteratively searching for a smallest distance position starting from the starting position and avoiding a local minimum comprising: determining a previous position, determining a new position, comparing the previous position and new position and based on the previous position and the new position comparison, selecting a new search center, wherein the new search center is based on the previous position if the new position is in an opposite direction from the previous position and the new search center is based on the new position if the new position is not in the opposite direction from the previous position.

In another aspect, a method of improving motion estimation using a computing device comprises determining a starting position comprising computing a distance value for each of a plurality of positions, comparing the distance value of each of the plurality of positions and selecting a smallest starting distance position from the distance value of each of the plurality of positions, iteratively searching for a smallest distance position starting from the starting position and determining a center point of a next search area comprising: determining a position of a search area with a smallest distance search value, determining an offset for a center point of a next search area based on the position with the smallest distance search value and selecting the center point of the next search area based on the offset.

In another aspect, a method of improving motion estimation using a computing device comprises determining a starting position comprising computing a distance value for each of a plurality of positions, comparing the distance value of each of the plurality of positions and selecting a smallest starting distance position from the distance value of each of the plurality of positions, iteratively searching for a smallest distance position starting from the starting position, determining a center point of a next search area comprising, determining a position of a search area with a smallest distance search value, determining an offset for a center point of a next search area based on the position with the smallest distance search value and selecting the center point of the next search area based on the offset and avoiding a local minimum comprising: determining a previous position, determining a new position, comparing the previous position and new position and based on the previous position and the new position comparison, selecting a new search center, wherein the new search center is based on the previous position if the new position is in an opposite direction from the previous position and the new search center is based on the new position if the new position is not in the opposite direction from the previous position.

In another aspect, a method of improving motion estimation using a computing device comprises determining a starting position comprising: computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to the smallest distance value of the smallest distance position to form a total cost, determining if a global motion vector is less than a threshold, if the global motion vector is less than the threshold, additional steps are taken, including: comparing the total cost with a predictive motion vector distance value to determine a smaller value and selecting the smaller value of the total cost and the predictive motion vector distance value for refinement, if the global motion vector is greater than or equal to the threshold, the smallest distance value of the smallest distance position is selected for refinement and determining a center point of a next search area comprising: determining a position of a search area with a smallest distance search value, determining an offset for a center point of a next search area based on the position with the smallest distance search value and selecting the center point of the next search area based on the offset.

In another aspect, a method of improving motion estimation using a computing device comprises determining a starting position comprising: computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to the smallest distance value of the smallest distance position to form a total cost, determining if a global motion vector is less than a threshold, if the global motion vector is less than the threshold, additional steps are taken, including: comparing the total cost with a predictive motion vector distance value to determine a smaller value and selecting the smaller value of the total cost and the predictive motion vector distance value for refinement, if the global motion vector is greater than or equal to the threshold, the smallest distance value of the smallest distance position is selected for refinement and avoiding a local minimum comprising: determining a previous position, determining a new position, comparing the previous position and new position and based on the previous position and the new position comparison, selecting a new search center, wherein the new search center is based on the previous position if the new position is in an opposite direction from the previous position and the new search center is based on the new position if the new position is not in the opposite direction from the previous position.

In another aspect, a method of improving motion estimation using a computing device comprising determining a starting position comprising: computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to the smallest distance value of the smallest distance position to form a total cost, determining if a global motion vector is less than a threshold, if the global motion vector is less than the threshold, additional steps are taken, including: comparing the total cost with a predictive motion vector distance value to determine a smaller value and selecting the smaller value of the total cost and the predictive motion vector distance value for refinement and if the global motion vector is greater than or equal to the threshold, the smallest distance value of the smallest distance position is selected for refinement and determining a center point of a next search area comprising: determining a position of a search area with the smallest distance search value, determining an offset for a center point of a next search area based on the position with the smallest distance search value and selecting the center point of the next search area based on the offset and avoiding a local minimum comprising: determining a previous position, determining a new position, comparing the previous position and new position and based on the previous position and the new position comparison, selecting a new search center, wherein the new search center is based on the previous position if the new position is in an opposite direction from the previous position and the new search center is based on the new position if the new position is not in the opposite direction from the previous position.

In another aspect, a method of improving motion estimation using a computing device comprises determining a starting position comprising: computing a distance value for each of a plurality of positions, comparing the distance value of each of the plurality of positions and selecting a smallest starting distance position from the distance value of each of the plurality of positions, iteratively searching for a smallest distance position starting from the starting position, adding a motion vector cost to the smallest distance value of the smallest distance position to form a total cost, determining if a global motion vector is less than a threshold, if the global motion vector is less than the threshold, additional steps are taken, including: comparing the total cost with a predictive motion vector distance value to determine a smaller value and selecting the smaller value of the total cost and the predictive motion vector distance value for refinement, if the global motion vector is greater than or equal to the threshold, the smallest distance value of the smallest distance position is selected for refinement and determining a center point of a next search area comprising: determining a position of a search area with the smallest distance search value, determining an offset for a center point of a next search area based on the position with the smallest distance search value and selecting the center point of the next search area based on the offset, avoiding a local minimum comprising: determining a previous position, determining a new position, comparing the previous position and new position and based on the previous position and the new position comparison, selecting a new search center, wherein the new search center is based on the previous position if the new position is in an opposite direction from the previous position and the new search center is based on the new position if the new position is not in the opposite direction from the previous position and terminating iteratively searching early comprising: computing a sub-region distance value of a sub-region, determining a minimum distance value of the sub-region, comparing the minimum distance value with a threshold, ending prematurely, if the minimum distance value is less than the threshold and repeating the steps until the count is zero, if the minimum distance value is greater than or equal to the threshold.

BRIEF DESCRIPTION OF THE DRAWINGS

FIG. 12 illustrates a matrix of positions in accordance with the invention.

FIG. 13 illustrates a matrix of positions with opposite positions shaded in accordance with the invention.

FIG. 17 illustrates a diagram of a flowchart of a next position selector in accordance with the invention.

FIGS. 18-20 illustrate next search areas based on the position with the smallest SAD of the current search area for a 3×3 search area in accordance with the invention.

DETAILED DESCRIPTION OF THE PREFERRED EMBODIMENT

Figure 1:
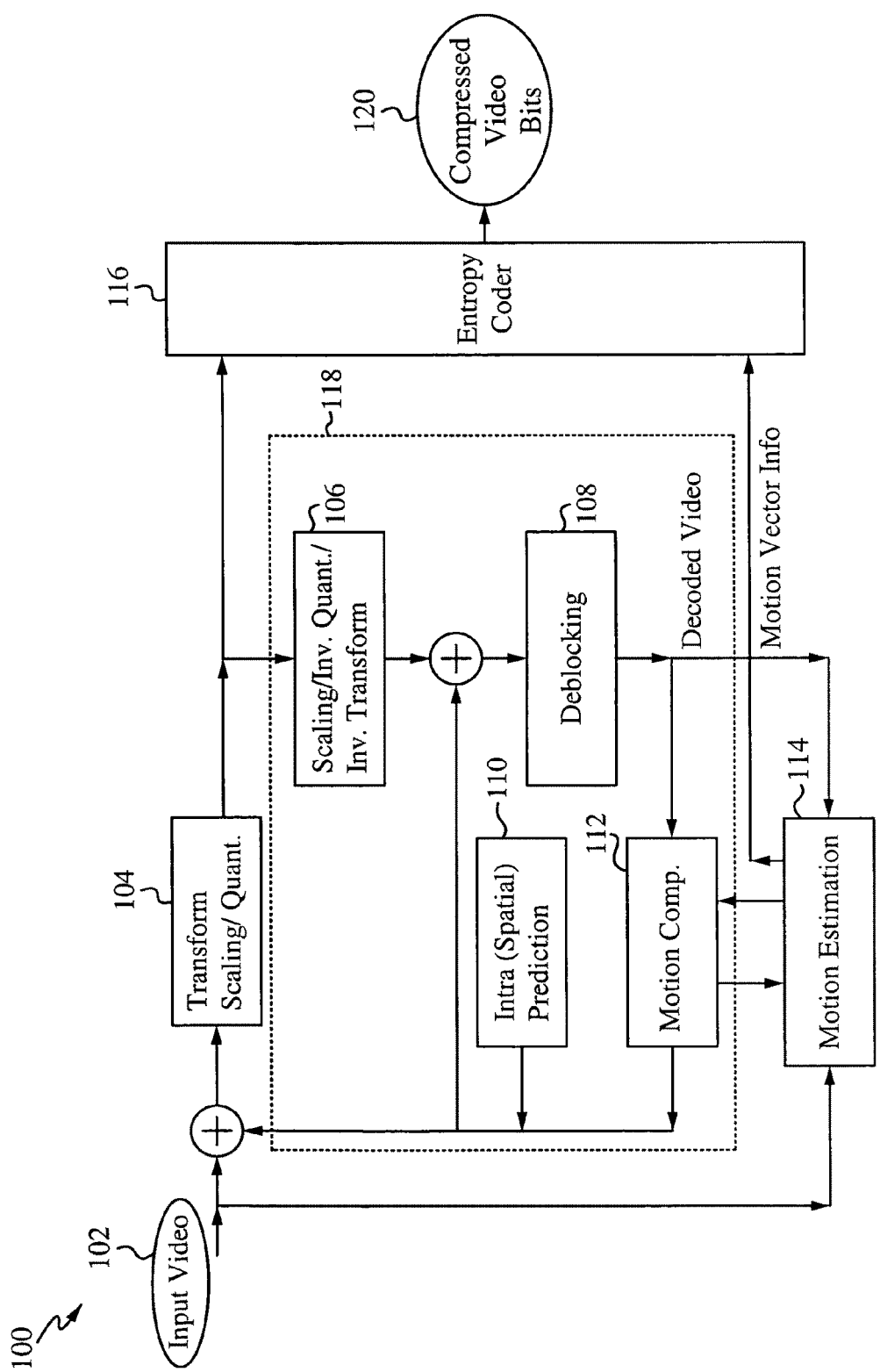
FIG. 1 illustrates a block diagram of a video coding layer in accordance with the invention.

FIG. 1 illustrates a block diagram of a video coding layer 100 of a macroblock. The video coding layer 100 (e.g. the encoder) includes a combination of temporal and spatial predictions along with transform coding. An input video 102 is received and split into a plurality of blocks. The first picture of a sequence is usually "intra" coded using only information contained within itself. Each part of a block in an intra frame is then predicted at the intra prediction module 110 using spatially neighboring samples of previously coded blocks. The encoding process chooses which neighboring samples are utilized for intra prediction and how they are used. This process is conducted at the local decoder 118 as well as at the encoder 100. For the rest of the pictures of a sequence, usually "inter" coding is used. Inter coding implements motion compensation 112 from other previously decoded pictures. The encoding process for inter prediction/motion estimation at the motion estimation module 114 includes choosing motion data, determining the reference picture and a spatial displacement that is applied to all samples of the block. The motion data is transmitted as side information which is used by the encoder 100 and the local decoder 118.

The difference between the original and the predicted block is referred to as the residual of the prediction. The residual is transformed, and the transform coefficients are scaled and quantized at the transform and scaling quantization module 104. For the quantization of transform coefficients, scalar quantization is utilized. Each block is transformed using an integer transform, and the transform coefficients are quantized and transmitted using entropy-coding methods. An entropy encoder 116 uses a codeword set for all elements except the quantized transform coefficients. For the quantized transform coefficients, Context Adaptive Variable Length Coding (CAVLC) or Context Adaptive Binary Arithmetic Coding (CABAC) is utilized. The deblocking filter 108 is implemented to control the strength of the filtering to reduce the blockiness of the image.

The encoder 100 also contains the local decoder 118 to generate prediction reference for the next blocks. The quantized transform coefficients are inverse scaled and inverse transformed 106 in the same way as the encoder side which gives a decoded prediction residual. The decoded prediction residual is added to the prediction, and the combination is directed to the deblocking filter 108 which provides decoded video as output. Ultimately, the entropy coder 116 produces compressed video bits 120 of the originally input video 102.

Figure 2:
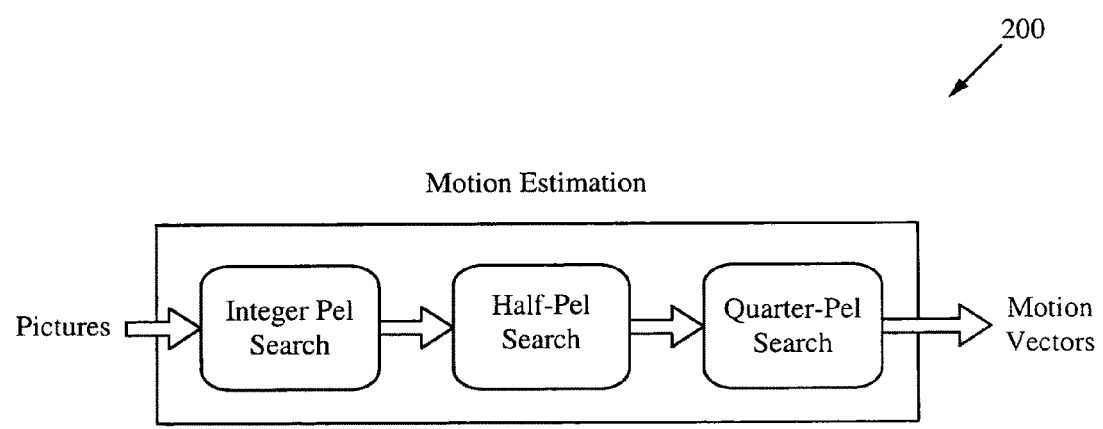
FIG. 2 illustrates motion estimation flow in accordance with the invention.

In Motion Estimation (ME) of video encoders, the most expensive calculation is the calculation of the Sum of Absolute Differences (SAD) between the predicted picture and the original picture. Particularly, the SAD calculation of the integer pel search is dominant. Therefore, reducing the number of SAD calculations in the integer pel search has a significant role in reducing hardware size, hence the costs. FIG. 2 illustrates motion estimation flow 200 which takes pictures and performs an integer pel search, a half-pel search and a quarter-pel search to determine motion vectors.

A popular approach for reducing the SAD calculations is to sub-sample the reference picture and the original picture before the SAD calculation, so that the ME hardware is able to search the same search range with a fewer number of SAD calculations. Within the sub-sampled search range, the search is still exhaustive. Since the search is done in the crude sub-sampled domain, refinement is needed to obtain finer motion vectors.

Figure 3:
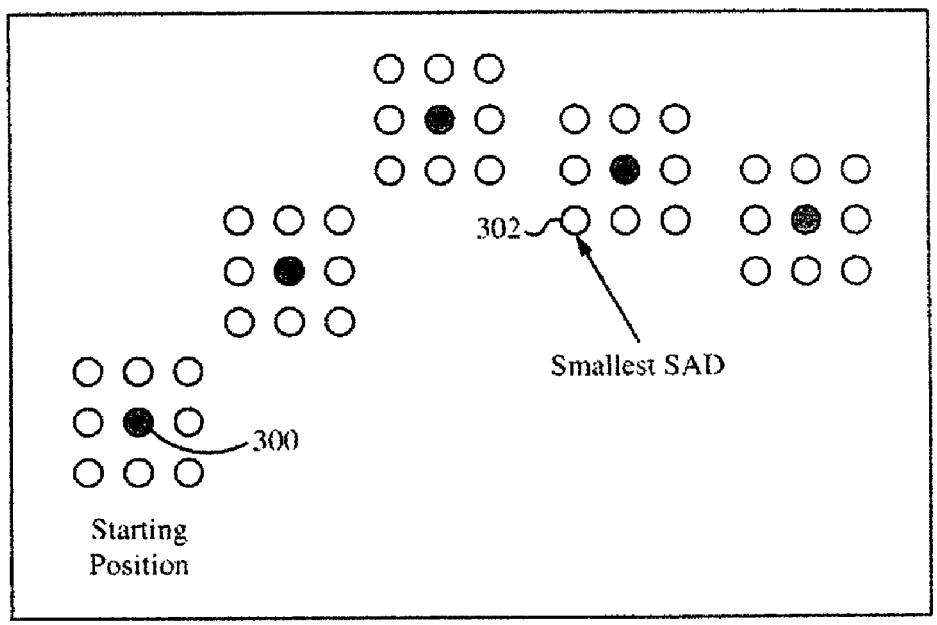
FIG. 3 illustrates an exemplary search in accordance with the invention.

The iterative motion estimation search method, described in "An 81 MHz, 1280×720 pixels×30 frames/s MPEG-4 video/audio CODEC processor" by Yamauchi, H. et al. which is incorporated by reference herein, further reduces the number of SAD calculations by calculating the SAD of only part of the search range. Using the method, the system calculates the SAD of a small region at a time. Then, the system compares the SAD of the region and picks the position of the minimum SAD. Next, the system selects another small region based on the previous search results. The system repeats the process a certain number of times. The search position that has the smallest SAD value during all iterations is selected as the best matching position. The number of iterations depends on the hardware performance. FIG. 3 illustrates an exemplary search showing a starting position 300 and a determined smallest SAD 302, where each step searches 9 search points (3×3) at a time and repeats 5 times.

Figure 4:
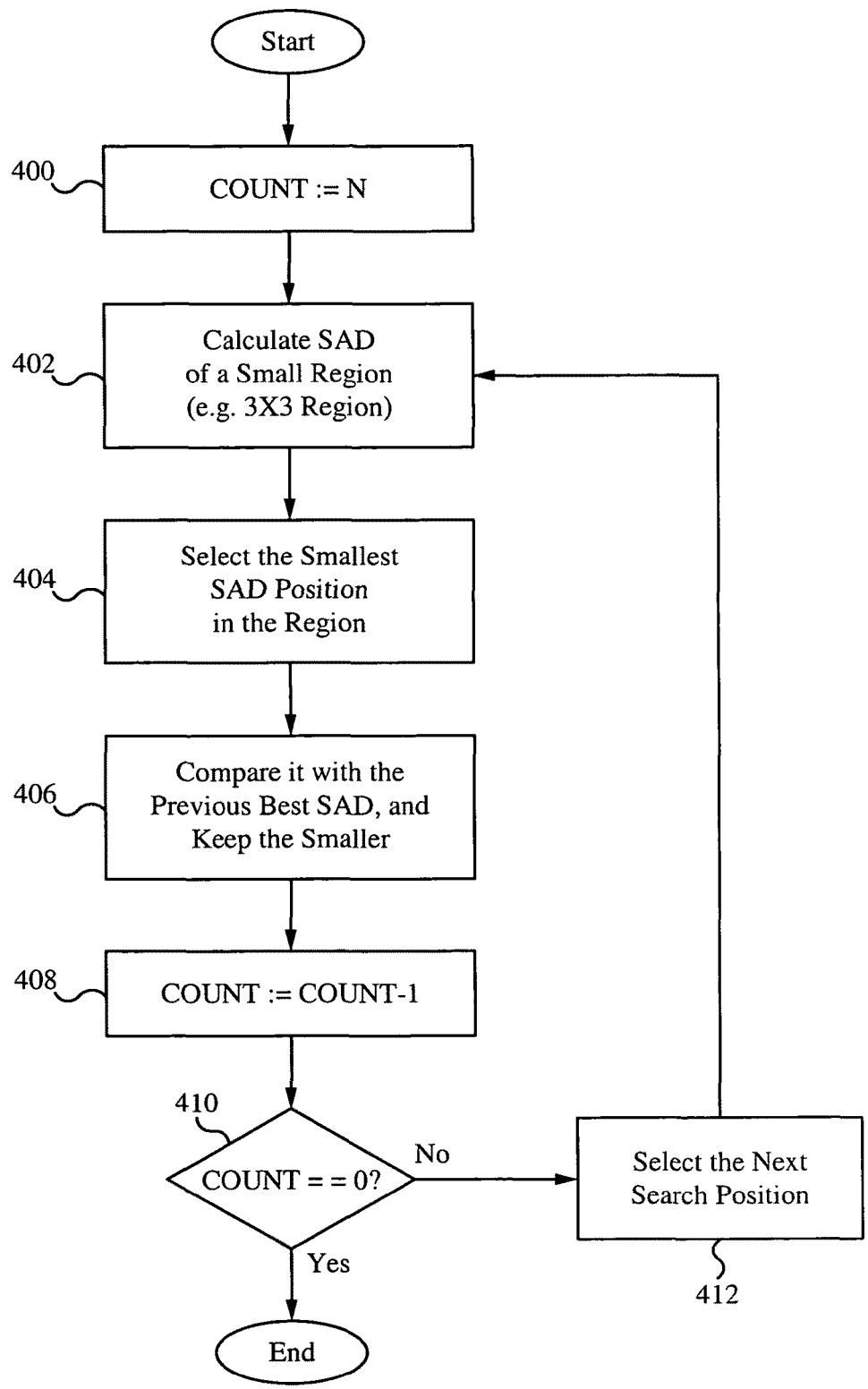
FIG. 4 illustrates a flowchart of an iterative search in accordance with the invention.

FIG. 4 illustrates a flowchart of an iterative search. In the step 400, the process starts with the count equal to N, where N is the number of times to search. In the step 402, the SAD of a region is calculated (e.g. a 3×3 region). In the step 404, the smallest SAD position is selected in the region based on the calculations of the step 402. In the step 406, the smallest SAD position is compared with the previous best (e.g. smallest) SAD and the smaller of the two is retained. In the step 408, the count is decremented by one to account for an iteration. In the step 410, it is determined if the count is 0. If the count is 0, then the process ends. If the count is not 0, then the next search position is selected in the step 412. Afterwards, the process repeats starting at the step 402. In some embodiments, a different implementation of counting or a different order of counting is able to be used.

Figure 5:
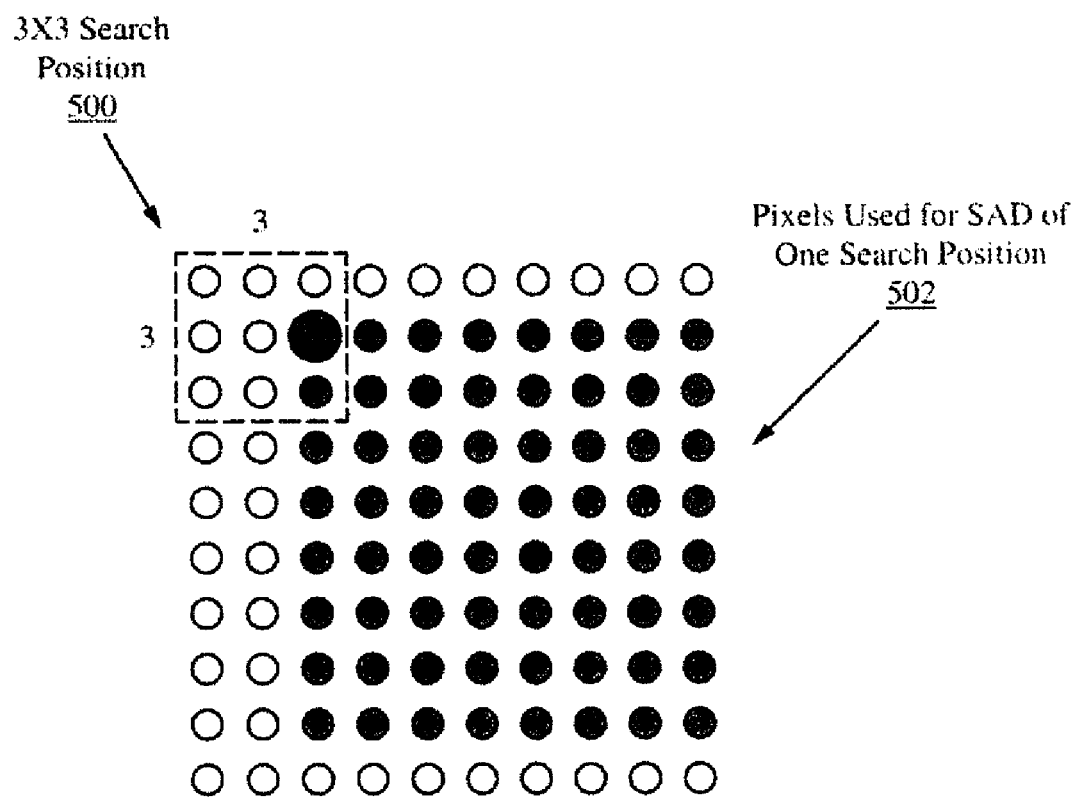
FIG. 5 illustrates an exemplary search position and pixels used for calculating the Sum of Absolute Differences (SAD) in accordance with the invention.

Since only part of the search range is searched, the number of SAD computations is dramatically reduced compared with the exhaustive search. In the sub-sampled search, a small number of search points (such as 9 in a 3×3 grid) are searched at a time, and the search is repeated a number N times (such as 5 times). The "3×3 search" means SAD calculations of "9 positions" not "9 SADs." Thus, if a macroblock (16×16 pixels) is sub-sampled to ¼ size (e.g. 8×8 pixels), the number of SADs for "one position" is 8×8=64. In hardware, the 64 SAD calculations are able to be calculated simultaneously. FIG. 5 illustrates an exemplary 3×3 search position 500 and a sub-sample 502 of a macroblock of 8×8 pixels. Although a 3×3 sub-sample search has been described, the size of the search is not limited to that size.

However, there is a problem with the sub-sampled iterative search because it does not check all of the positions in the search range. Therefore, the search does not guarantee that the best possible solution will be found. Specifically, the search is able to go in the wrong direction and/or the best search position is able to be too far from the starting position.
Speculative Starting Point To solve the above issues, the speculative starting point iterative search scheme is used. Using the speculative search scheme, before the iteration starts, the system compares SADs of several "promising" positions. Then, the best of the "promising" positions is used as a starting position of the iterative search. In the implementation for the H.264 encoder, the search is performed in two steps, although alternatively the search is able to be performed in any number of steps.

Figure 6:
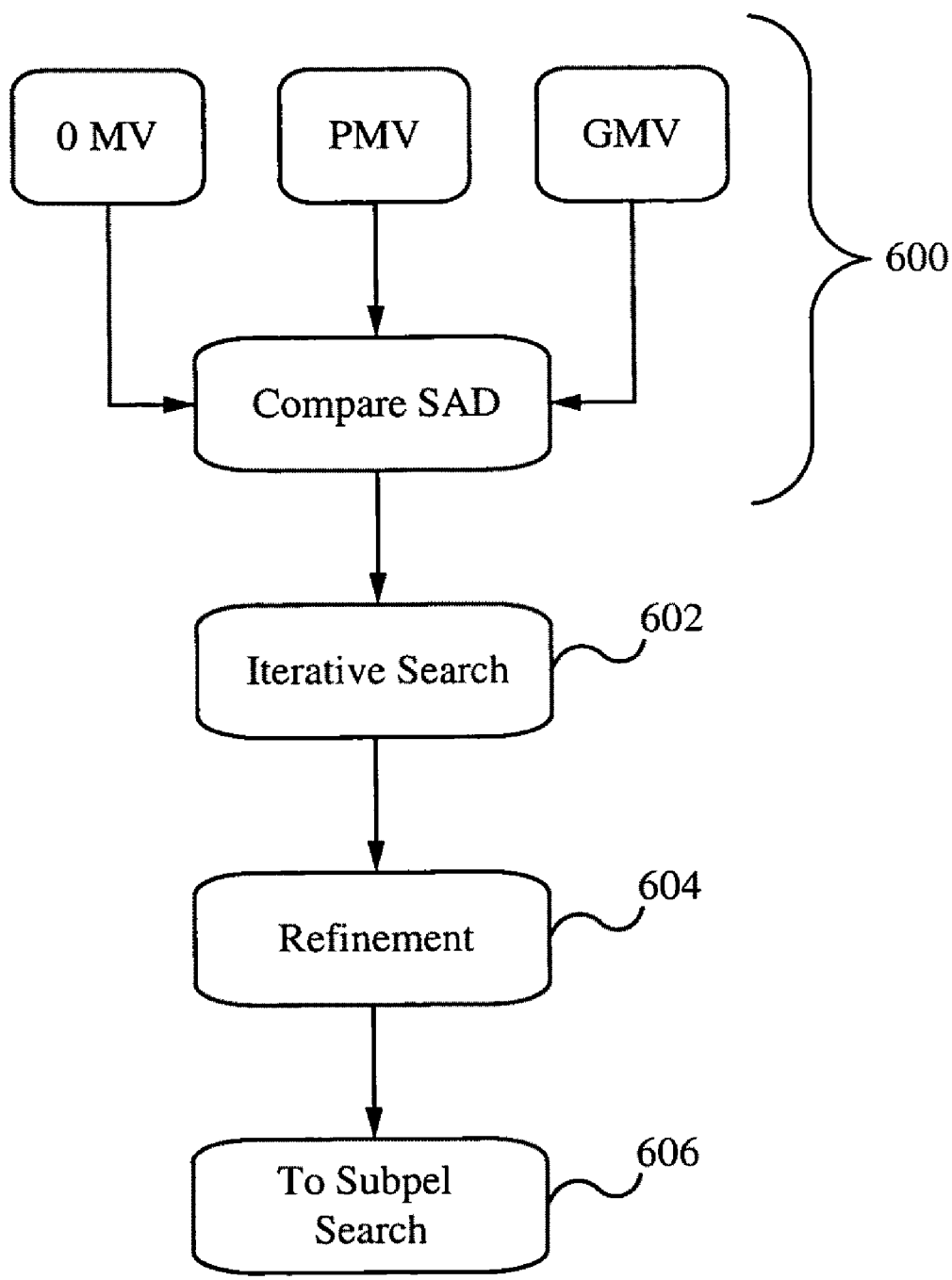
FIG. 6 illustrates a flowchart of implementing the speculative start point selection to estimate motion in accordance with the invention.

FIG. 6 illustrates a flowchart of implementing the speculative start point selection to estimate motion. In the step 600, the SAD is calculated of three positions: Global Motion Vector (GMV), zero (0) Motion Vector (0MV) and Predicted Motion Vector (PMV). GMV is calculated once per frame from the statistics of the previously encoded frame, and PMV is estimated for each macroblock from the adjacent macroblocks in the current frame. The position that has the smallest SAD is used as the starting position of the following iterative search. Depending on the Coder/Decoder (CODEC), various positions are able to be chosen as the "promising" positions, not limited to those above. Although three positions are described above, the number of positions available to choose from is not limited to three; more or less positions are able to be chosen from.

In the step 602, the system performs the iterative search described in FIG. 4. However, the starting position of the iteration is the best starting position from the step 600. In some embodiments, after the step 600, the selected SAD is used as the starting position for other implementations of iterative searches. In the step 604, the motion vector is refined. In the step 606, a subpel search is implemented. The result is a smooth image/video processed in a shorter amount of time.

Figure 7:
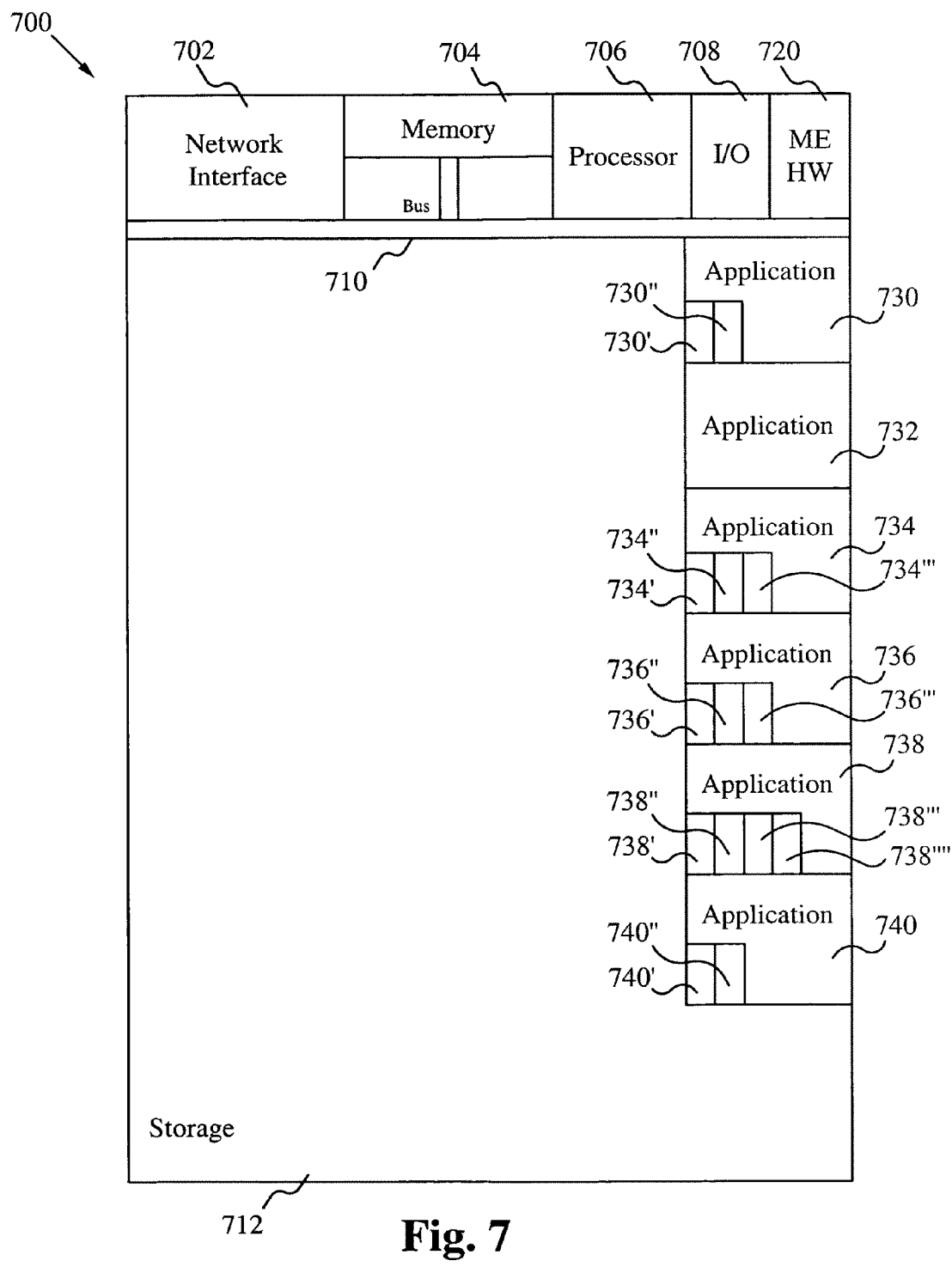
FIG. 7 illustrates a block diagram of an exemplary computing device in accordance with the present invention.

FIG. 7 illustrates a block diagram of an exemplary computing device 700 in accordance with the present invention. The computing device 700 is able to be used to acquire, store, compute, communicate and/or display information such as images and videos. For example, a computing device 700 acquires a video and while acquiring the video, the improved motion estimation process occurs. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Application(s) 730 used to perform the methods of the present invention are likely to be stored in the storage device 712 and memory 704 and processed as applications are typically processed. The applications 730 include a starting point component 730' for determining the starting point and an iterative search component 730" for performing the iterative search, as well as any other desired or necessary components. More or less components shown in FIG. 7 are able to be included in the computing device 700. In some embodiments, motion estimation hardware 720 is included for processing motion estimation information. Although the computing device 700 in FIG. 7 includes applications 730 and hardware 720 for motion estimation processing, the improved motion estimation process is able to be implemented on a computing device in hardware, firmware, software or any combination thereof.

Examples of suitable computing devices include a personal computer, laptop computer, computer workstation, a server, mainframe computer, handheld computer, personal digital assistant, cellular/mobile telephone, smart appliance, gaming console, digital camera, digital camcorder, camera phone, iPod®, home entertainment system or any other suitable computing device.

To utilize the speculative starting point iterative search scheme, a computing device operates as usual, but the motion estimation process is improved in that it is more efficient and more accurate. The utilization of the computing device from the user's perspective is similar or the same as one that uses standard motion estimation. For example, the user still simply turns on a digital camcorder and uses the camcorder to record a video. The improved motion estimation process is able to automatically improve the video quality. For example, the speculative starting point iterative search scheme is able to be used anywhere that requires motion estimation such as an image stabilizer. Many other applications are able to utilize the improved motion estimation process.

In operation, by using the speculative starting point iterative search scheme, the iterative search is improved in a number of ways. The improved iterative search avoids going to a completely wrong position since the iterative search starts from the best possible starting point. The number of total iterations is able to be reduced since the iteration search is likely able to start from a position near the best possible position in the search range using a starting MV selected among "static location" (0MV), "the global movement" such as camera pan (GMV) and "motion of an object" (PMV). Even if the best position (e.g. the MV) is large, the search position is able to be reached if the iteration starts from the global motion. The speculative starting point iterative search scheme for the H.264 encoder dramatically reduces the SAD calculation time.

Local Minimum Avoidance

Figure 9:
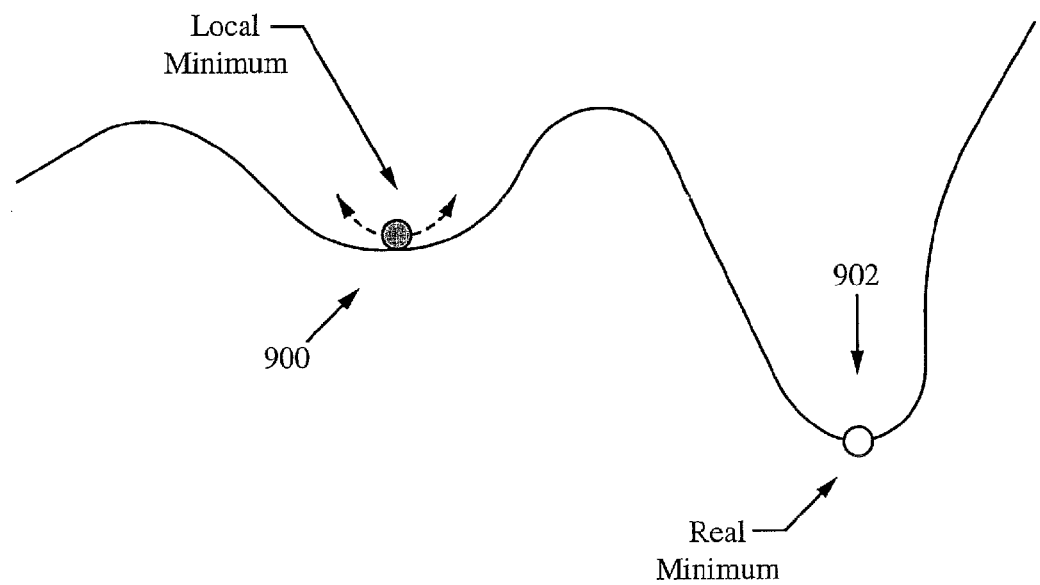
FIG. 9 illustrates a search stuck in a local minimum in accordance with the invention.
Figure 10:
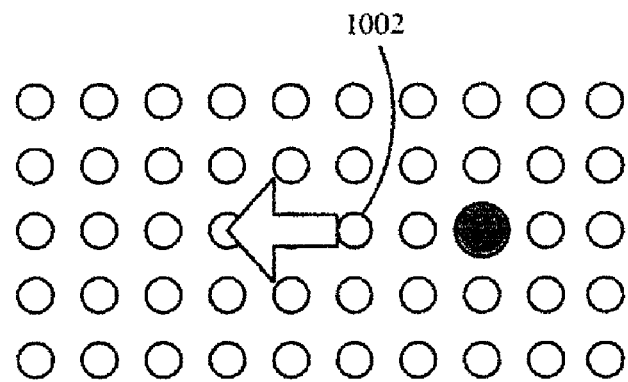
FIG. 10 illustrates a naive next step selection back in the opposite direction in accordance with the invention.

A crucial aspect of the iterative search is how to select the next center points. If the system simply selects a direction that has a smallest SAD, the system is able to be in the position going back and forth in a local minimum. For example, a naive system is able to select a direction of the smallest SAD point. In the example shown in FIG. 8, it is reasonable to advance to the right when a position 802 has the smallest SAD value of a 5×5 area 800. The next iteration is a search on a 5×5 area to the right. However, the search is able to be in a local minimum 900 as shown in the FIG. 9 and not a real minimum 902. In this case, the smallest SAD of the next iteration is the left center 1002 in the 5×5 area, as shown in FIG. 10. Then, a naive selection algorithm decides the next search goes to the left 5×5 area, which has already been searched. In the following search, the smallest SAD is again the center right, and the search continues back and forth, remaining in the local minimum.

Figure 8:
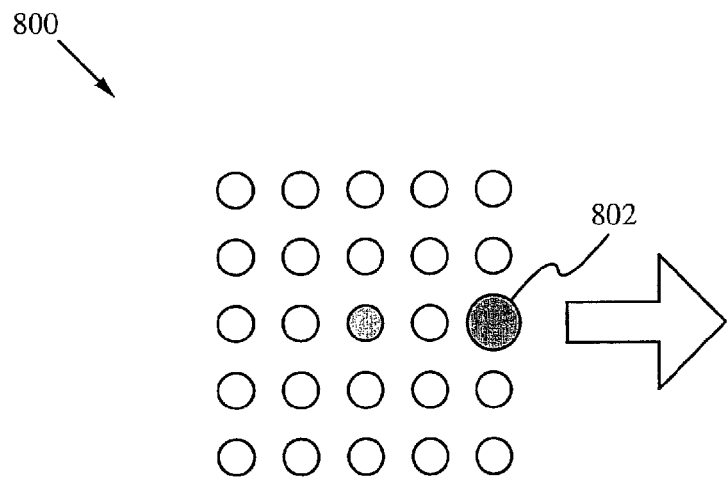
FIG. 8 illustrates a naive next step selection in accordance with the invention.
Figure 11:
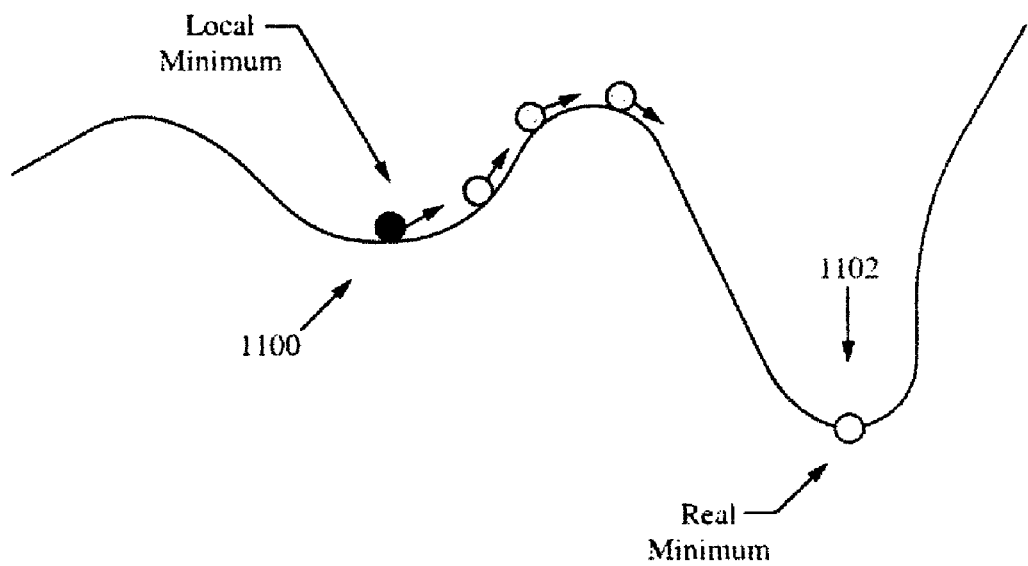
FIG. 11 illustrates a search moving out of a local minimum in accordance with the invention.

To avoid remaining in a local minimum, the local minimum avoidance search determines if the next direction to be analyzed is the opposite of the previously analyzed direction. Before the search proceeds to the next search center, the search retains the smallest SAD position of the current search. In the case of FIG. 8, the system remembers it is going East. After SAD calculations of the next search positions are finished, and the best SAD is picked, the system checks if it is trying to proceed to the "opposite direction" of the previous iteration. In the case of FIG. 10, the new direction is West, which is exactly opposite to the previous direction. If this happens, the system decides to proceed to the previously selected orientation (e.g. East). After avoiding the opposite direction a couple of times, the search is able to escape the local minimum 1100 and move towards the real minimum 1102 as shown in FIG. 11.

Figure 14:
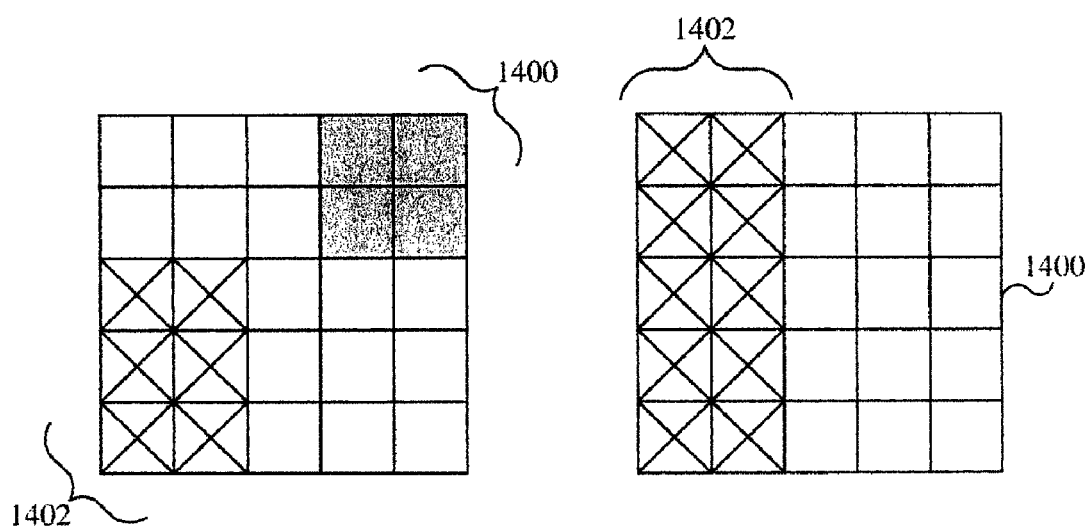
FIG. 14 illustrates new positions and prohibited opposite positions in accordance with the invention.

FIGS. 12 through 14 illustrate an exemplary implementation of the local minimum avoidance search. In the implementation for an H.264 video encoder, the system only stores the smallest SAD position of the previous search. For a 5×5 search 1200, a number from 0 through 24 is retained. FIG. 12 shows the smallest SAD is determined to be position 14 in the East, center position.

In the next step in the iteration, after a new smallest SAD position is calculated, the new position is compared with the previous best position. Based on a lookup table or other mapping scheme, the method/system is able to know which positions are considered to be in the opposite direction. For example, the best position in the previous step is 14 in FIG. 12, therefore the shaded positions 1300 in FIG. 13 are considered as "opposite to the previous best."

If the new position is any of these shaded positions 1300, the system considers the iteration as "retreating" to the previous search positions. Then, the system overrides the basic iteration rule and chooses East as the next direction.

In the case of a 5×5 search, some applicable rules have been reduced to the patterns shown in FIG. 14. The other positions are able to be applied by rotating the figure. Shaded positions 1400 for previous search positions are shown, and corresponding prohibited positions 1402 are shown opposite the shaded positions 1400. In general, corner positions result in the opposite corner positions, possibly with an extension to be considered opposites, and side/top/bottom positions have the respective opposing side/bottom/top as the opposite positions.

Figure 15:
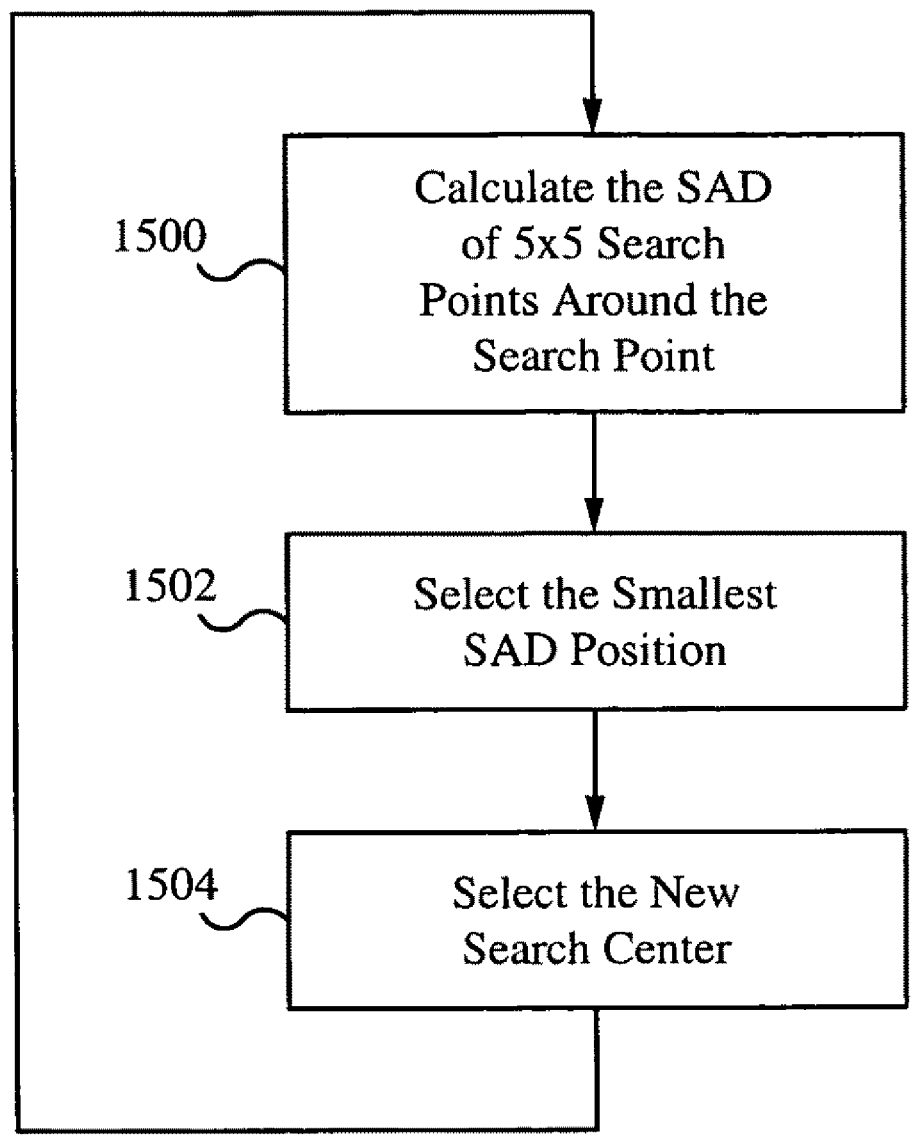
FIG. 15 illustrates a flowchart of a naive search in accordance with the invention.

FIG. 15 illustrates a flowchart of a simplified iterative search. In the step 1500, the SAD of a 5×5 search is calculated. In the step 1502, the smallest SAD position is selected. Then, in the step 1504, a new search center is selected based on the current search result. The process repeats for a specified number of times, until a threshold is reached or until another criteria is met.

Figure 16:
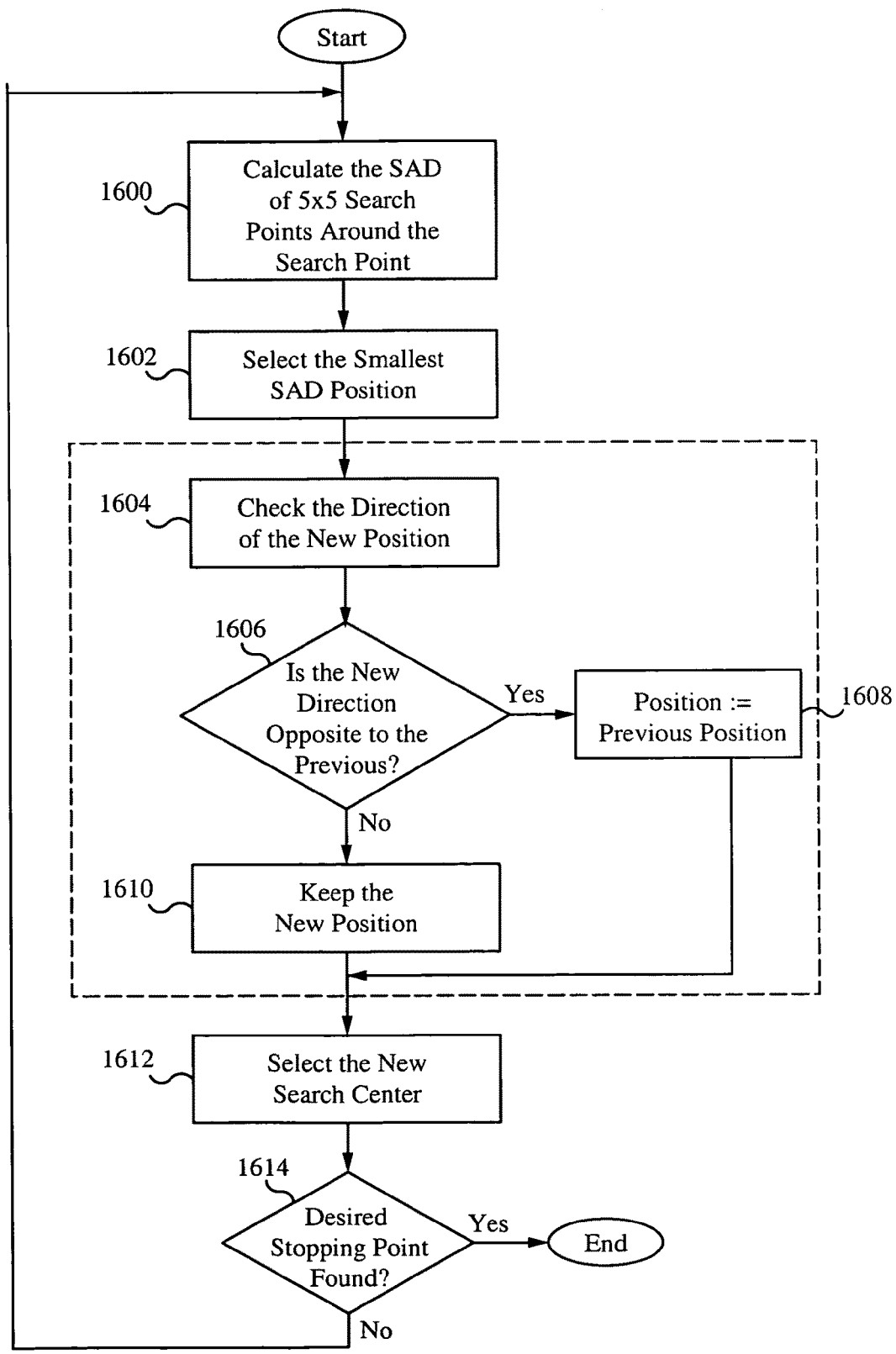
FIG. 16 illustrates a flowchart of a local minimum avoidance search in accordance with the invention.

The flow of the local minimum avoidance search is illustrated in FIG. 16. Before the new search center is selected, the new direction is checked to determine if the direction is retreating. If so, the direction is replaced with the previous direction. The direction is determined by the position of the smallest SAD. For example, if the smallest SAD is a center-East position, then the direction is East. If the direction is an upper-East position, the direction is North-East, and so on.

Specifically, in the step 1600, the SAD of each search position of a 5×5 area is calculated. In the step 1602, the position with the smallest SAD is selected. In the step 1604, the direction of the new position is determined. In the step 1606, it is determined if the direction is opposite to the previous direction. If the direction is not opposite, then the new position is retained, in the step 1608, and the step 1610 is skipped. If the direction is opposite, then the new position is set to the previous position, in the step 1610. Then, in the step 1612, the new search center is selected based on the position determined in the step 1608 or the step 1610. The process repeats for a specified number of times, until a threshold is reached or until another criteria is met, in the step 1614.

In some embodiments, when a "retreat" is detected, the same direction is followed (e.g. the previous orientation). In some embodiments, when a "retreat" is detected, an adjusted direction is taken, where the adjusted direction is somewhere between the previous direction and the new direction.

Although a 5×5 search has been used for exemplary purposes, any appropriately sized search is possible.

As described above, FIG. 7 illustrates a computing device 700. In addition to the computing device being able to execute the speculative starting point method, the computing device is able to execute local minimum avoidance in addition to or instead of other applications. In some embodiments, the computing device 700 includes an additional application 732 for avoiding local minimums. In some embodiments, the local minimum avoidance method is implemented in the same application as the speculative start point selection application 730. In some embodiments, the computing device ME HW 720 is configured to avoid local minimums. Local minimum avoidance is able to be implemented in hardware, firmware, software or any combination thereof.

To utilize the local minimum avoidance search, a computing device operates as usual, but the motion estimation process is improved in that it is more efficient and more accurate since local minimums will be avoided. The utilization of the computing device from the user's perspective is similar or the same as one that uses standard motion estimation. For example, the user still simply turns on a digital camcorder and uses the camcorder to record a video. The local minimum avoidance search is able to automatically improve the video quality. For example, the local minimum avoidance search is able to be used anywhere that requires motion estimation such as an image stabilizer. Many other applications are able to utilize the local minimum avoidance process.

In operation, the local minimum avoidance search avoids a local minimum by preventing the iterative search from continuously going back and forth searching the same positions.

Next Search Position Scheme

Since the iterative search is able to only search limited points in the search range, if the search points are not selected effectively, the picture quality degrades significantly. In addition, the search point selection is performed at every step in the iteration. Therefore, the decision-making algorithm is preferably fast.

A next search position scheme is able to quickly decide the next search center based only on the position of the smallest SAD.

Figures 17, 18:
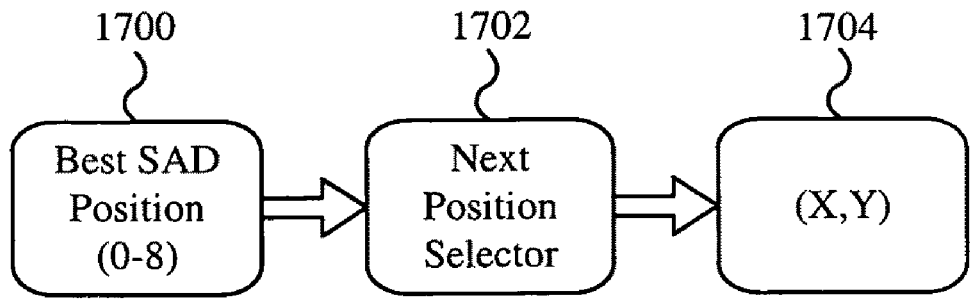

FIG. 17 illustrates a diagram of a flowchart of a next position selector 1702 in operation. An input 1700 of the next position selector 1702 is the position of the smallest SAD in the current search. In the case of 3×3 steps, the position is a number from 0 to 8 as shown in FIG. 18. An output 1704 is the offset from the current search center to the new search center. The iterative search then moves based on the output.

For example, when the position of the smallest SAD is one of a position labeled "1" or in FIG. 18, the next search center will be 3 pixels North of the current search center. Thus, if the search center of the current search is at the position (10, 10) and the best/smallest SAD position in the 3×3 search area is at position 1, the next search center will be at the position (10, 7). However, if the smallest SAD is at position 5, the next search center will be 3 pixels East. Thus, if the current search center is at the position (10, 10), the new search center will be at the position (13, 10).

Figures 19, 20:
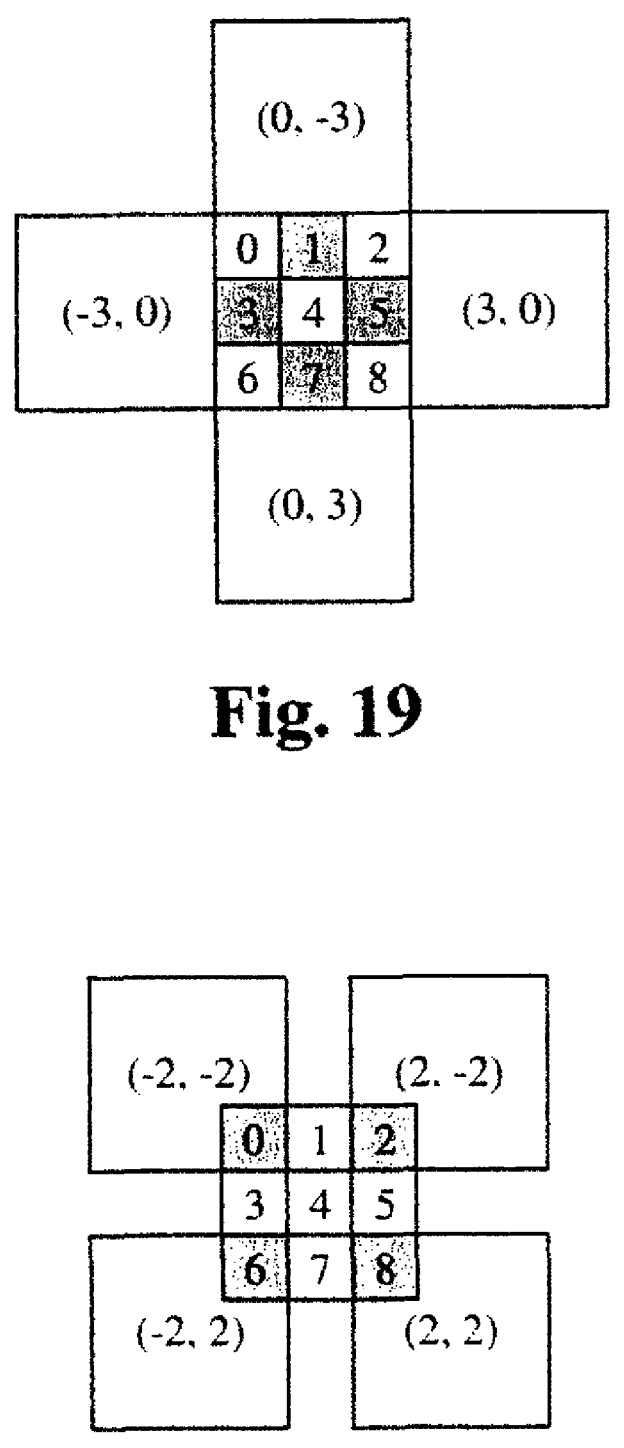

FIGS. 18-20 illustrate next search areas based on the position with the smallest SAD of the current search area for a 3×3 search area. FIG. 18 illustrates a 3×3 search with each position designated by a number. The pattern includes only horizontal, vertical and diagonal positions. FIG. 19 shows the horizontal positions (3, 5) and vertical positions (1, 7) which have corresponding next search area offsets—Position 1: North (0, −3), Position 3: West (−3, 0), Position 7: South (0, 3) and Position 5: East (3, 0). FIG. 20 shows diagonal positions (0, 2, 6, 8) which have corresponding search area offsets—Position 0: Northwest (−2, −2), Position 6: Southwest (−2, 2), Position 8: Southeast (2, 2) and Position 2: Northeast (2, −2).

Although a 3×3 search area has been described, any appropriate search area is possible.

Figure 21:
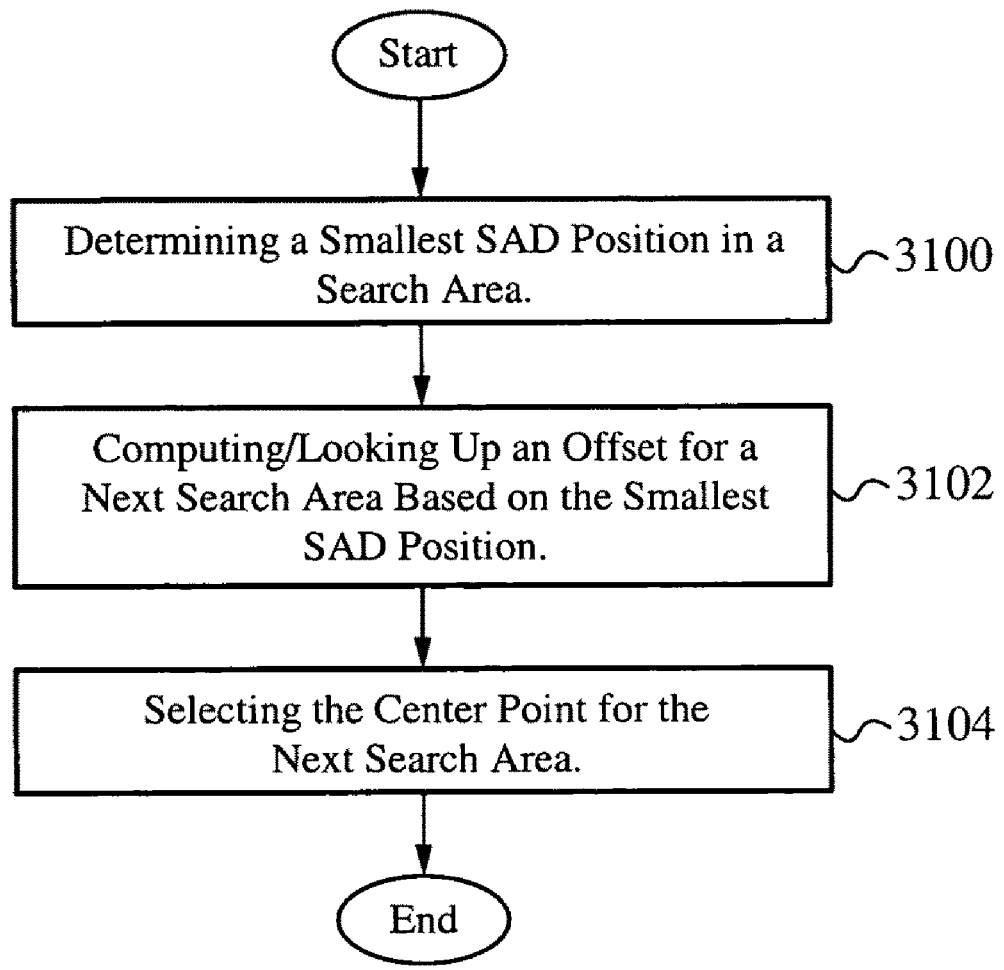
FIG. 21 illustrates a flowchart of a method of selecting a next position in accordance with the invention.

FIG. 21 illustrates a flowchart of a method of selecting a next position. In the step 3100, a position with a smallest SAD in a search area is determined. In some embodiments, the search area is 3×3 pixels, and in some embodiments, the search area is of a different size. In the step 3102, an offset for a next search area center point is automatically computed/looked up for a next search area based on the smallest SAD position. In some embodiments, the actual location of the next center point is computed based on the current center point. In the step 3104, the center point is selected for the next search area.

The rules used by the next position selector are able to be implemented by a look-up table. In some embodiments, the rules are implemented by another means. In some embodiments, the value of the SAD itself is not even needed. The rules simply use the position of the smallest SAD to determine a center point of the next search area. Furthermore, since the rules are implemented in a look-up table, they are able to be changed easily, if desired.

Figure 22:
FIG. 22 illustrates an exemplary look-up table for determining the center point of the next search area based on the position with the smallest SAD in accordance with the invention.

FIG. 22 illustrates an exemplary look-up table 3200 for determining the center point of the next search area based on the position with the smallest SAD. As described above, the offset to the center point of the next search area is determined based on the smallest SAD position. As shown in FIG. 22, if the smallest SAD is at position 0, then the center point of the next search area is at an offset of (−2, −2). Other look-up values are also shown. FIG. 22 assumes a search area of 3×3 pixels. For other search areas, the values would change accordingly.

The next search area selection scheme in combination with the simple local minimum avoidance search scheme is able to achieve high quality encoding with small processor cycles in the H.264 encoder.

As described above, FIG. 7 illustrates a computing device 700. In addition to the computing device 700 being able to execute the speculative starting point iterative search scheme and the local minimum avoidance method, the computing device 700 is able to execute the next search position selection method instead of or in addition to other applications. In some embodiments, the computing device 700 includes an additional application 734 for selecting the next search position. In some embodiments, the next search position selection method is implemented in the same application such as the application 732 or the speculative start point selection application 730. In some embodiments, the application 734 or hardware 720 for selecting the next search position includes an input component 734' for receiving the smallest SAD position of the search area, a mapping component 734" such as a lookup table for looking up an offset based on the smallest SAD position and an output component 734'" for outputting the offset of the center point of the next search area. In some embodiments, instead of or in addition to the offset being output, the actual location of the center point of the next search area is determined. In some embodiments, the computing device ME HW 720 is configured to select the next search position. Next search position selection is able to be implemented in hardware, firmware, software or any combination thereof.

To utilize the next position selector, a computing device operates as usual, but the motion estimation process is improved in that it is more efficient and more accurate since a better next position to be searched will be selected. The utilization of the computing device from the user's perspective is similar or the same as one that uses standard motion estimation. For example, the user still simply turns on a digital camcorder and uses the camcorder to record a video. The next position selector is able to automatically improve the video quality. For example, the next position selector is able to be used anywhere that requires motion estimation such as an image stabilizer. Many other applications are able to utilize the next position selector.

In operation, the next position selector determines the center point of the next search area to improve efficiency of motion estimation. Furthermore, since the next position selector uses a simple scheme, it is easily implemented.

Refinement Scheme

In a smooth, flat area, most positions have similar SAD values. Therefore, search algorithms are easily fooled since any motion vector seems to be a good candidate. However, if the ME selects arbitrary motion vectors, more bits are consumed for motion vector headers rather than coefficients causing worse subjective picture quality. In addition, although it does not influence signal to noise ratio much, the inconsistent motion in a smooth surface generates unnatural pictures degrading the subjective quality.

When the original picture has lots of noise, the SAD calculation is easily fooled by the noise. Sometimes, those incorrect motion vectors have smaller SAD values because of the noise. However, those incorrect motions are easily spotted by human eyes.

A scheme to refine the iterative search using Predictive Motion Vectors (PMV) is described. The PMV is the most likely motion vector of the current macroblock that is predicted from the adjacent macroblocks.

Figure 23:
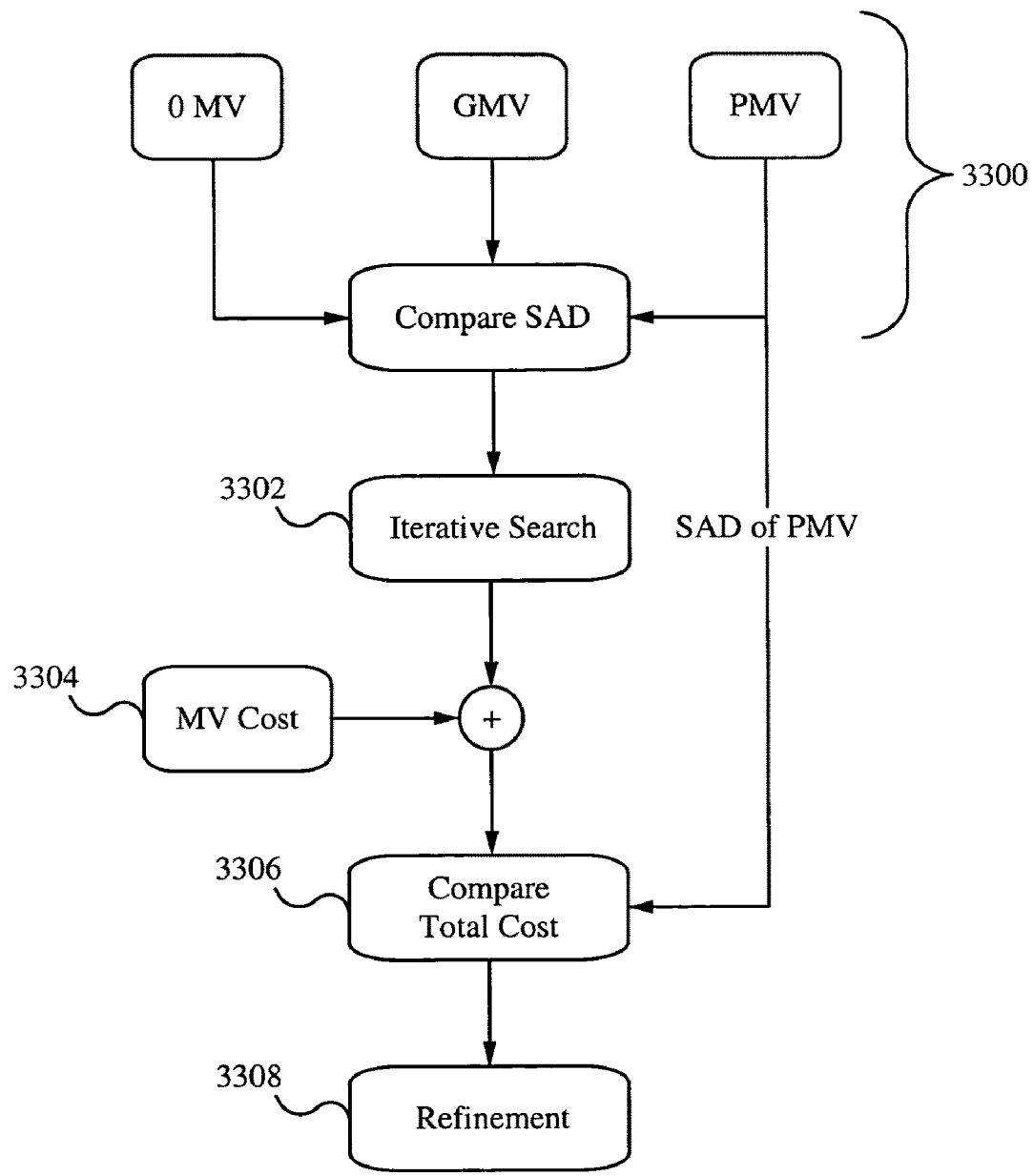
FIG. 23 illustrates a flowchart of the iterative search using refinement based on motion vector cost and the SAD of a predicted motion vector in accordance with the invention.

The flow of the iterative search using motion vectors of the surrounding macroblocks is shown in FIG. 23. PMV refinement gives the PMV position two chances. In the step 3300, the SAD is calculated of three positions: Global Motion Vector (GMV), zero (0) Motion Vector (0MV) and Predicted Motion Vector (PMV). GMV is calculated once per frame from the statistics of the previously encoded frame, and PMV is estimated for each macroblock from the adjacent macroblocks in the current frame. The position that has the smallest SAD is used as the starting position of the following iterative search. Depending on the Coder/Decoder (CODEC), various positions are able to be chosen as the "promising" positions, not limited to those above. Although three positions are described above, the number of positions available to choose from is not limited to three; more or less positions are able to be chosen from.

In the step 3302, the system performs the iterative search described in FIG. 4. However, the starting position of the iteration is the best starting position from the step 3300. The SAD value of the PMV position is calculated and compared with other positions such as 0MV and global MV to decide the starting position of the iteration as described above. In some embodiments, after the step 3300, the selected SAD is used as the starting position for other implementations of iterative searches. The iterative search results in the smallest SAD position. In the step 3304, the motion vector cost is added to the SAD of the iterative search winner, while no MV cost is added to the SAD of PMV. Then, the winner of the iterative search (e.g. the smallest SAD position) with the added motion vector cost is compared again with the SAD of the PMV position in the step 3306. The smaller of the iterative search result with motion vector cost and the SAD of the PMV is selected. In the step 3308, the motion vector is refined. The result is a smooth image/video processed in a shorter amount of time.

There are various ways to calculate the MV costs. In general, motion vector cost is calculated based on the distance from the PMV. Thus, MV cost is not added to the pMV position.

Figure 24:
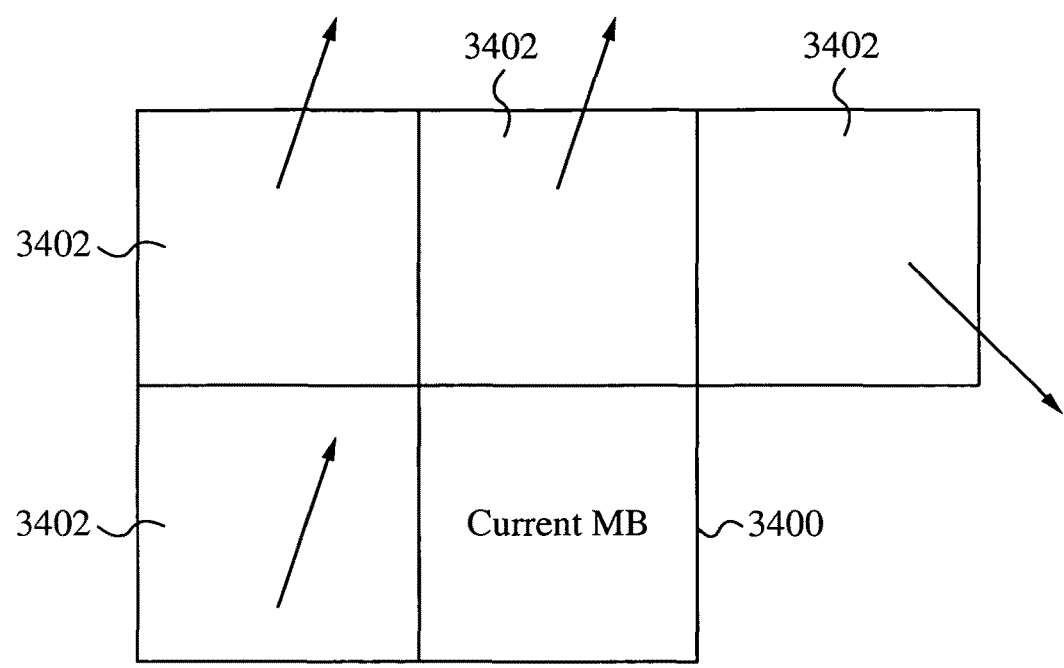
FIG. 24 illustrates a current macroblock with adjacent macroblocks and their motion vectors in accordance with the invention.

FIG. 24 illustrates a current macroblock 3400 with adjacent macroblocks 3402 and their motion vectors. The PMV is calculated from the adjacent macroblocks 3402.

The refinement scheme prevents the iterative search from selecting arbitrary motion vectors. This also helps the motion vectors become consistent even in a smooth surface, saving the bits spent for motion vector headers. This results in an improved subjective picture quality. Moreover, even in the noisy video sequence, the system is less likely to be fooled.

The refinement scheme does not limit the way to calculate the PMV. Furthermore, the refinement scheme is able to be applied to any kind of ME application.

As described above, FIG. 7 illustrates a computing device 700. The computing device 700 is also able to execute the refinement scheme. In some embodiments, the computing device 700 includes an additional application 736 for executing the refinement scheme. In some embodiments, the application 736 has a starting position component 736', an iterative search component 736" and an additional comparison component 736'". In some embodiments, the refinement scheme is implemented in the same application as one of the previously discussed applications. In some embodiments, the computing device ME HW 720 is configured to implement the refinement scheme. The refinement scheme is able to be implemented in hardware, firmware, software or any combination thereof.

To utilize the refinement scheme, a computing device operates as usual, but the motion estimation process is improved in that it is more efficient and more accurate, specifically for smooth, flat areas, since a proper motion vectors will be selected. The utilization of the computing device from the user's perspective is similar or the same as one that uses standard motion estimation. For example, the user still simply turns on a digital camcorder and uses the camcorder to record a video. The refinement scheme is able to automatically improve the video quality. For example, the refinement scheme is able to be used anywhere that requires motion estimation such as an image stabilizer. Many other applications are able to utilize the refinement scheme.

In operation, the refinement scheme determines the appropriate motion vector by adding the motion vector cost to the SAD of the motion vector and comparing that value with the SAD of the PMV. The lower of the two is then used for refinement of the motion vector. This additional comparison helps to avoid issues that arise from smooth flat areas in images or noisy images.

Refinement Scheme with Threshold

When the motion of a picture is very large, the refinement scheme described above has some negative effects. Specifically, the system compares the winner of the iterative search with the PMV position. However, the total cost is compared with the PMV position, where the total cost is "SAD+MV cost," while the total cost of the PMV is only the SAD. Thus, when the motion in the picture is large, the MV cost also tends to be relatively large. This causes the refinement scheme to strongly discourage the motion estimation system from producing large motion vectors.

Figure 25:
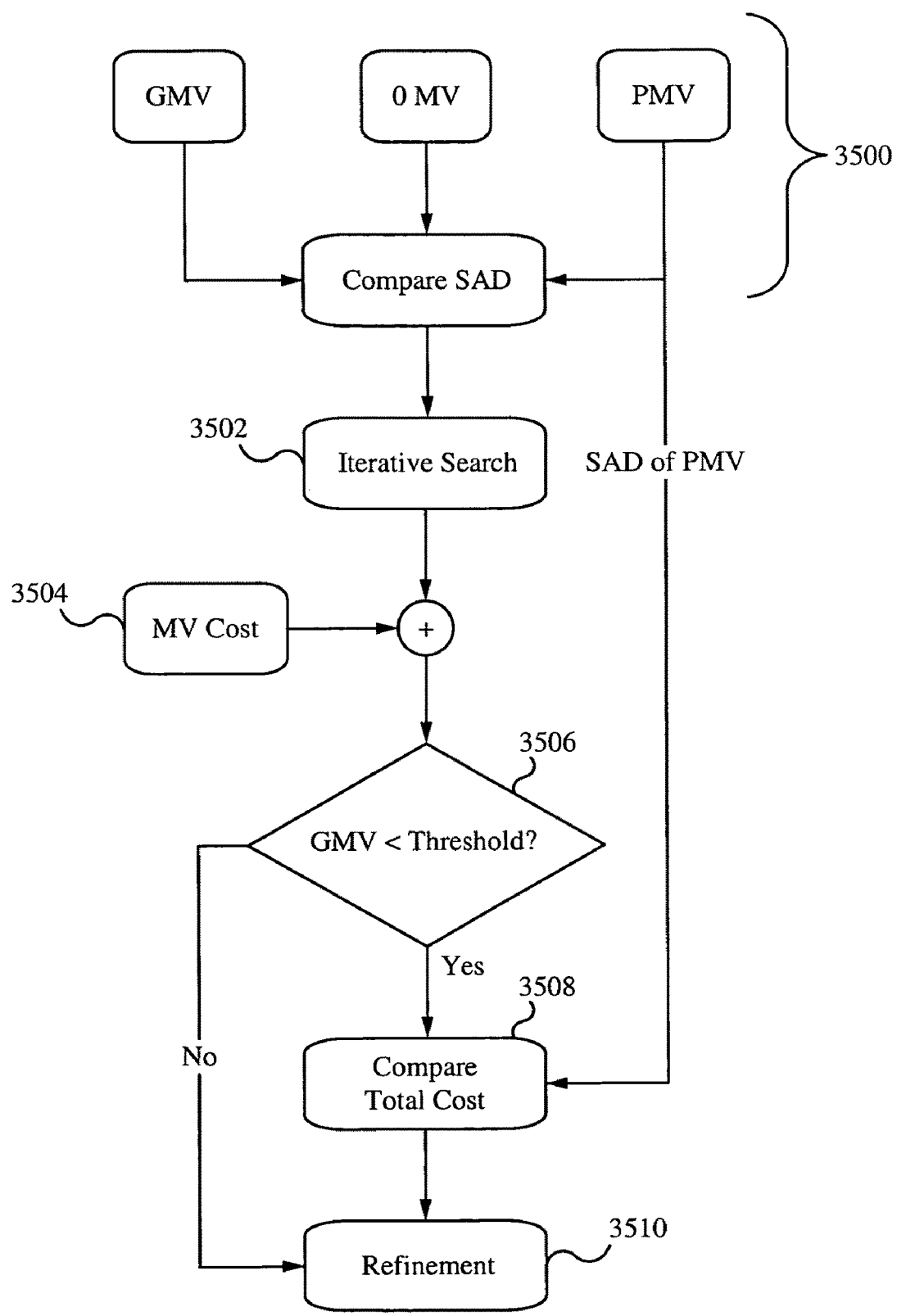
FIG. 25 illustrates a flowchart of the iterative search using refinement based on motion vector cost and the SAD of a predicted motion vector and a threshold in accordance with the invention.

The flow of the iterative search using motion vectors of the surrounding macroblocks with an added threshold is shown in FIG. 25. PMV refinement gives the PMV position two chances, but the threshold determines if the second chance is helpful. In the step 3500, the SAD is calculated of three positions: Global Motion Vector (GMV), zero (0) Motion Vector (0MV) and Predicted Motion Vector (PMV). GMV is calculated once per frame from the statistics of the previously encoded frame, and PMV is estimated for each macroblock from the adjacent macroblocks in the current frame. The position that has the smallest SAD is used as the starting position of the following iterative search. Depending on the Coder/Decoder (CODEC), various positions are able to be chosen as the "promising" positions, not limited to those above. Although three positions are described above, the number of positions available to choose from is not limited to three; more or less positions are able to be chosen from.

In the step 3502, the system performs the iterative search described in FIG. 4. However, the starting position of the iteration is the best starting position from the step 3500. The SAD value of the PMV position is calculated and compared with other positions such as 0MV and global MV (GMV) to decide the starting position of the iteration as described above. In some embodiments, after the step 3500, the selected SAD is used as the starting position for other implementations of iterative searches. The iterative search results in the smallest SAD position. In the step 3504, the motion vector cost is added to the SAD of the iterative search winner. In some embodiments, the order of the steps 3504 and 3506 are switched. The GMV is compared with a threshold, in the step 3506. If the GMV is less than the threshold, then the winner of the iterative search (e.g. the smallest SAD position) with the added motion vector cost is compared with the SAD of the PMV position in the step 3508. The smaller of the iterative search result and the SAD of the PMV is selected. In the step 3510, the selected motion vector is refined. In the step 3506, if the GMV is greater than or equal to the threshold, then the comparison in the step 3508 is skipped, and the result of the iterative search is the motion vector that is refined in the step 3510. The result is a smooth image/video processed in a shorter amount of time.

The refinement scheme with a threshold prevents the iterative search from selecting arbitrary motion vectors and also prevents the PMV precedence from discouraging larger motion vectors. This also helps the motion vectors become consistent even in a smooth surface, saving the bits spent for motion vector headers. This results in an improved subjective picture quality when the motion in the picture is large.

The refinement scheme with a threshold does not limit the way to calculate the PMV. Furthermore, the refinement scheme is able to be applied to any kind of ME applications.

As described above, FIG. 7 illustrates a computing device 700. The computing device 700 is also able to execute the refinement scheme with a threshold. In some embodiments, the computing device 700 includes an additional application 738 for executing the refinement scheme with a threshold. In some embodiments, the application 738 has a starting position component 738', an iterative search component 738", a threshold component 738'" and an additional comparison component 738"". In some embodiments, the refinement scheme with a threshold is implemented in the same application as one of the previously discussed applications. In some embodiments, the computing device ME HW 720 is configured to implement the refinement scheme with a threshold. The refinement scheme with a threshold is able to be implemented in hardware, firmware, software or any combination thereof.

To utilize the refinement scheme with a threshold, a computing device operates as usual, but the motion estimation process is improved in that it is more efficient and more accurate, specifically for smooth, flat areas, since a proper motion vector will be selected. The utilization of the computing device from the user's perspective is similar or the same as one that uses standard motion estimation. For example, the user still simply turns on a digital camcorder and uses the camcorder to record a video. The refinement scheme with a threshold is able to automatically improve the video quality. For example, the refinement scheme with a threshold is able to be used anywhere that requires motion estimation such as an image stabilizer. Many other applications are able to utilize the refinement scheme with a threshold.

In operation, the refinement scheme with a threshold first determines if a comparison with the iterative search result with the PMV is appropriate based on a comparison of the GMV and a threshold. If appropriate, then the refinement scheme with a threshold determines the appropriate motion vector by adding the motion vector cost to the SAD of the motion vector and comparing that value with the SAD of the PMV. The lower of the two is then used for refinement of the motion vector. If not appropriate, the motion vector from the iterative search result is used for refinement.

Early Termination Scheme

Although the iterative search algorithms reduce the number of SAD calculations, the power consumption of the SAD is still large in the system. Therefore, ways of reducing the number of iterations will in turn reduce power consumption.

To reduce power consumption of the iterative search, the iterative search is terminated when a "good" search candidate is found. The system compares the best SAD of one step with a threshold value. If the best SAD value is smaller than the threshold, that is considered a "good" search candidate and the iteration is terminated. Otherwise, the search continues as usual.

Figure 26:
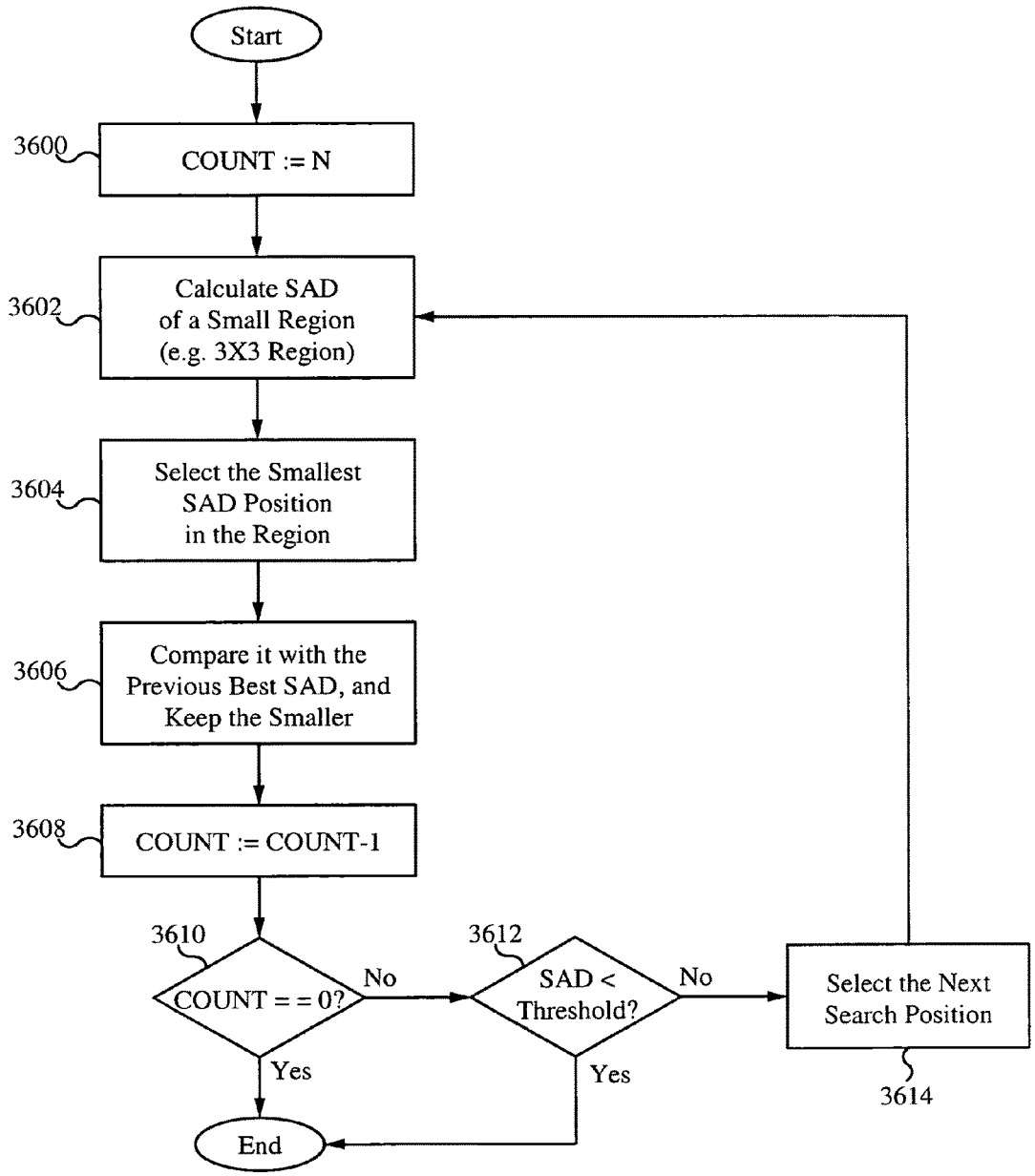
FIG. 26 illustrates a flowchart of the iterative search with an early termination scheme in accordance with the invention.

FIG. 26 illustrates a flowchart of an iterative search with a threshold. In the step 3600, the process starts with the count equal to N, where N is the number of times to search. In the step 3602, the SAD of a region is calculated (e.g. a 3×3 region). In the step 3604, the smallest SAD position is selected in the region based on the calculations of the step 3602. In the step 3606, the smallest SAD position is compared with the previous best (e.g. smallest) SAD and the smaller of the two is retained. In the step 3608, the count is decremented by one to account for the comparison in the step 3606. In the step 3610, it is determined if the count is 0. If the count is 0, then the process ends. If the count is not 0, then it is determined if the retained SAD is less than a threshold, in the step 3612. If the SAD is less than the threshold, the process ends. If the SAD is not less than the threshold, then the next search position is selected in the step 3614. Afterwards, the process repeats starting at the step 3602. In some embodiments, a different implementation of counting or a different order of counting is able to be used.

As described above, FIG. 7 illustrates a computing device 700. The computing device 700 is also able to execute the early termination scheme. In some embodiments, the computing device 700 includes an additional application 740 for executing the early termination scheme. In some embodiments, the early termination scheme is implemented in the same application as one of the previously discussed applications. In some embodiments, the application 740 includes an iterative search component 740' for iteratively searching and a threshold component 740" for early termination if the threshold condition is met. In some embodiments, the computing device ME HW 720 is configured to implement the early termination scheme. The early termination scheme is able to be implemented in hardware, firmware, software or any combination thereof.

To utilize the early termination scheme, a computing device operates as usual, but the motion estimation process is improved in that it is more efficient. The utilization of the computing device from the user's perspective is similar or the same as one that uses standard motion estimation. For example, the user still simply turns on a digital camcorder and uses the camcorder to record a video. The early termination scheme is able to automatically improve the video quality. For example, the early termination scheme is able to be used anywhere that requires motion estimation such as an image stabilizer. Many other applications are able to utilize the early termination scheme.

In operation, the early termination scheme determines if a best SAD is less than a threshold. If the best SAD is less than the threshold, then the scheme ends without completing the rest of the count. The early termination scheme reduces power consumption of the iterative search when motion estimation is implemented in hardware. When implemented in software, the early termination scheme reduces the processor cycles, resulting in faster encoding speed.

Any and/or all of the methods described above are able to be implemented on separate devices or a single device as desired. For example, it is possible for a digital camcorder to include the speculative starting point method, the local minimum avoidance, the next search position scheme, the refinement scheme, the refinement scheme with threshold and the early termination scheme.

Although SAD is described herein as a distance metric implemented in the iterative search to calculate the degree of pattern match, there are many other distance or error metrics which are able to be used such as error values or other distances, including but not limited to Sum of Absolute Transferred Distances and Mean Squared Error.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of refining an iterative search result for motion estimation using a computing device, the method comprising:
   a. determining a starting position comprising:
      i. computing a distance value for each of a plurality of positions;
      ii. comparing the distance value of each of the plurality of positions; and
      iii. selecting a smallest starting distance position from the distance value of each of the plurality of positions;
   b. iteratively searching for a smallest distance position starting from the starting position;
   c. adding a motion vector cost to a smallest distance value of the smallest distance position to form a total cost;
   d. comparing the total cost with a predictive motion vector distance value to determine a smaller value; and
   e. selecting the smaller value of the total cost and the predictive motion vector distance value.

2. The method of claim 1 wherein the distance value is a Sum of Absolute Differences value.

3. The method of claim 1 wherein the plurality of positions includes a first position, a second position and a third position.

4. The method of claim 3 wherein the first position is a zero (0) motion vector, the second position is a predicted motion vector and the third position is a global motion vector.

5. The method of claim 1 wherein the motion vector cost is calculated based on a distance from a predicted motion vector.

6. The method of claim 1 wherein the smaller value is further refined and stabilizes an image.

7. The method of claim 1 wherein iteratively searching further comprises:
   a. setting a count to a specified value;
   b. computing a sub-region distance value of a sub-region;
   c. selecting a smallest regional distance value in the sub-region;
   d. comparing the smallest regional distance value with a previous smallest regional distance;
   e. retaining a smaller regional distance value of the smallest regional distance value and the previous smallest regional distance value;
   f. decrementing the count; and
   g. repeating b-f until the count is zero.

8. The method of claim 1 wherein iteratively searching further comprises:
 a. computing a sub-region distance value of a sub-region;
 b. determining a minimum distance value of the sub-region;
 c. comparing the minimum distance value with a threshold;
 d. ending prematurely, if the minimum distance value is less than the threshold; and
 e. repeating a-d until the count is zero, if the minimum distance value is greater than or equal to the threshold.

9. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

10. A system for refining an iterative search result for motion estimation, the system comprising:
 a. a memory for storing an application, the application configured for:
  i. determining a starting position comprising:
   (1) computing a distance value for each of a plurality of positions;
   (2) comparing the distance value of each of the plurality of positions; and
   (3) selecting a smallest starting distance position from the distance value of each of the plurality of positions;
  ii. iteratively searching for a smallest distance position starting from the starting position;
  iii. adding a motion vector cost to a smallest distance value of the smallest distance position to form a total cost;
  iv. comparing the total cost with a predictive motion vector distance value to determine a smaller value; and
  v. selecting the smaller value of the total cost and the predictive motion vector distance value; and
 b. a processor for processing the application.

11. The system of claim 10 wherein the distance value is a Sum of Absolute Differences value.

12. The system of claim 10 wherein the plurality of positions includes a first position, a second position and a third position.

13. The system of claim 12 wherein the first position is a zero (0) motion vector, the second position is a predicted motion vector and the third position is a global motion vector.

14. The system of claim 10 wherein the motion vector cost is calculated based on a distance from a predicted motion vector.

15. The system of claim 10 wherein iteratively searching further comprises:
 a. setting a count to a specified value;
 b. computing a sub-region distance value of a sub-region;
 c. selecting a smallest regional distance value in the sub-region;
 d. comparing the smallest regional distance value with a previous smallest regional distance value;
 e. retaining a smaller regional distance value of the smallest regional distance value and the previous smallest regional distance value;
 f. decrementing the count; and
 g. repeating b-f until the count is zero.

16. The system of claim 10 wherein iteratively searching further comprises:
 a. computing a sub-region distance value of a sub-region;
 b. determining a minimum distance value of the sub-region;
 c. comparing the minimum distance value with a threshold;
 d. ending prematurely, if the minimum distance value is less than the threshold; and
 e. repeating a-d until the count is zero, if the minimum distance value is greater than or equal to the threshold.

17. The system of claim 10 wherein the smaller value is further refined and used to stabilize an image.

18. The system of claim 10 wherein the processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

19. An application for refining an iterative search result for motion estimation processed by a processor, the application comprising:
 a. a starting position component for determining a smallest starting position for starting an iterative search;
 b. an iterative search component for iteratively searching for a smallest distance position; and
 c. a comparison component for comparing a total cost with a predicted motion vector distance value, wherein the total cost includes a smallest distance value of the smallest distance position and a motion vector cost.

20. The application of claim 19 wherein determining a smallest starting position includes:
 a. computing a distance value for each of a plurality of positions;
 b. comparing the distance value of each of the plurality of positions; and
 c. selecting a smallest starting distance position from the distance value of each of the plurality of positions.

21. The application of claim 19 wherein the plurality of positions includes a first position, a second position and a third position.

22. The application of claim 21 wherein the first position is a zero (0) motion vector, the second position is a predicted motion vector and the third position is a global motion vector.

23. The application of claim 19 wherein iteratively searching further comprises:
 a. setting a count to a specified value;
 b. computing a sub-region distance value of a sub-region;
 c. selecting a smallest regional distance value in the sub-region;
 d. comparing the smallest regional distance value with a previous smallest regional distance value;
 e. retaining a smaller regional distance value of the smallest regional distance value and the previous smallest regional distance value;
 f. decrementing the count; and
 g. repeating b-f until the count is zero.

24. The application of claim 19 wherein the motion vector cost is calculated based on a distance from a predicted motion vector.

25. The application of claim 19 wherein the best distance position is used to determine an appropriate motion vector which is used to stabilize an image.

26. The application of claim 19 wherein the application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

27. A method of refining an iterative search result for motion estimation using a computing device, the method comprising:
 a. determining a starting position comprising:
  i. computing a distance value for each of a plurality of positions;
  ii. comparing the distance value of each of the plurality of positions; and
  iii. selecting a smallest starting distance position from the distance value of each of the plurality of positions;
 b. iteratively searching for a smallest distance position starting from the starting position;
 c. adding a motion vector cost to a smallest distance value of the smallest distance position to form a total cost;
 d. determining if a global motion vector is less than a threshold;
 e. if the global motion vector is less than the threshold, additional steps are taken, including:
  i. comparing the total cost with a predictive motion vector distance value to determine a smaller value; and
  ii. selecting the smaller value of the total cost and the predictive motion vector distance value for refinement; and
 f. if the global motion vector is greater than or equal to the threshold, the smallest distance value of the smallest distance position is selected for refinement.

28. The method of claim 27 wherein the distance value is a Sum of Absolute Differences value.

29. The method of claim 27 wherein the plurality of positions includes a first position, a second position and a third position.

30. The method of claim 29 wherein the first position is a zero (0) motion vector, the second position is a predicted motion vector and the third position is a global motion vector.

31. The method of claim 27 wherein the motion vector cost is calculated based on a distance from a predicted motion vector.

32. The method of claim 27 wherein the method stabilizes an image.

33. The method of claim 27 wherein iteratively searching further comprises:
 a. setting a count to a specified value;
 b. computing a sub-region distance value of a sub-region;
 c. selecting a smallest regional distance value in the sub-region;
 d. comparing the smallest regional distance value with a previous smallest regional distance value;
 e. retaining a smaller regional distance value of the smallest regional distance value and the previous smallest regional distance value;
 f. decrementing the count; and
 g. repeating b-f until the count is zero.

34. The method of claim 27 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

35. A system for refining an iterative search result for motion estimation, the system comprising:
 a. a memory for storing an application, the application configured for:
  i. determining a starting position comprising:
   (1) computing a distance value for each of a plurality of positions;
   (2) comparing the distance value of each of the plurality of positions; and
   (3) selecting a smallest starting distance position from the distance value of each of the plurality of positions;
  ii. iteratively searching for a smallest distance position starting from the starting position;
  iii. adding a motion vector cost to a smallest distance value of the smallest distance position to form a total cost;
  iv. determining if a global motion vector is less than a threshold;
  v. if the global motion vector is less than the threshold, additional steps are taken, including:
   (1) comparing the total cost with a predictive motion vector distance value to determine a smaller value; and
   (2) selecting the smaller value of the total cost and the predictive motion vector distance value for refinement; and
  vi. if the global motion vector is greater than or equal to the threshold, the smallest distance value of the smallest distance position is selected for refinement; and
 b. a processor for processing the application.

36. The system of claim 35 wherein the distance value is a Sum of Absolute Differences value.

37. The system of claim 35 wherein the plurality of positions includes a first position, a second position and a third position.

38. The system of claim 37 wherein the first position is a zero (0) motion vector, the second position is a predicted motion vector and the third position is a global motion vector.

39. The method of claim 35 wherein the motion vector cost is calculated based on a distance from a predicted motion vector.

40. The system of claim 35 wherein iteratively searching further comprises:
 a. setting a count to a specified value;
 b. computing a sub-region distance value of a sub-region;
 c. selecting a smallest regional distance value in the sub-region;
 d. comparing the smallest regional distance value with a previous smallest regional distance value;
 e. retaining a smaller regional distance value of the smallest regional distance value and the previous smallest regional distance value;
 f. decrementing the count; and
 g. repeating b-f until the count is zero.

41. The system of claim 35 wherein the system stabilizes an image.

42. The system of claim 35 wherein the processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

43. An application for refining an iterative search result for motion estimation processed by a processor, the application comprising:
   a. a starting position component for determining a smallest starting position for starting an iterative search;
   b. an iterative search component for iteratively searching for a smallest distance position;
   c. a comparison component for comparing a total cost with a predicted motion vector distance value, wherein the total cost includes a smallest distance value of the smallest distance position and a motion vector cost; and
   d. a threshold component for comparing a global motion vector with a threshold to determine whether to execute the comparison component or to use a result from the iterative search component.

44. The application of claim 43 wherein determining a smallest starting position includes:
   a. computing a distance value for each of a plurality of positions;
   b. comparing the distance value of each of the plurality of positions; and
   c. selecting a smallest starting distance position from the distance value of each of the plurality of positions.

45. The application of claim 43 wherein the plurality of positions includes a first position, a second position and a third position.

46. The application of claim 45 wherein the first position is a zero (0) motion vector, the second position is a predicted motion vector and the third position is a global motion vector.

47. The application of claim 43 wherein iteratively searching further comprises:
   a. setting a count to a specified value;
   b. computing a sub-region distance value of a sub-region;
   c. selecting a smallest regional distance value in the sub-region;
   d. comparing the smallest regional distance value with a previous smallest regional distance value;
   e. retaining a smaller regional distance value of the smallest regional distance value and the previous smallest regional distance value;
   f. decrementing the count; and
   g. repeating b-f until the count is zero.

48. The application of claim 43 wherein the motion vector cost is calculated based on a distance from a predicted motion vector.

49. The application of claim 43 wherein the application stabilizes an image.

50. The application of claim 43 wherein the application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

51. A method of selecting a starting position for a motion estimation iterative search using a computing device, the method comprising:
   a. computing a distance value for each of a plurality of positions, wherein the plurality of positions includes a first position, a second position and a third position, wherein the first position is a zero (0) motion vector, the second position is a predicted motion vector and the third position is a global motion vector;
   b. comparing the distance value of each of the plurality of positions; and
   c. selecting a smallest starting distance position from the distance value of each of the plurality of positions.

52. The method of claim 51 wherein the distance value is a Sum of Absolute Differences value.

53. The method of claim 51 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

54. The method of claim 51 wherein the smallest starting distance position is used as the starting position for the motion estimation iterative search which stabilizes an image.

55. A method of estimating motion using a computing device, the method comprising:
   a. determining a starting position comprising:
      i. computing a distance value for each of a plurality of positions;
      ii. comparing the distance value of each of the plurality of positions; and
      iii. selecting a smallest starting distance position from the distance value of each of the plurality of positions; and
   b. iteratively searching for a smallest distance position starting from the starting position.

56. The method of claim 55 wherein the distance value is a Sum of Absolute Differences value.

57. The method of claim 55 wherein iteratively searching further comprises:
   a. setting a count to a specified value;
   b. computing a sub-region distance value of a sub-region;
   c. selecting a smallest regional distance value in the sub-region;
   d. comparing the smallest regional distance value with a previous smallest regional distance value;
   e. retaining a smaller regional distance value of the smallest regional distance value and the previous smallest regional distance value;
   f. decrementing the count; and
   g. repeating b-f until the count is zero.

58. The method of claim 55 wherein the plurality of positions includes a first position, a second position and a third position.

59. The method of claim 58 wherein the first position is a zero (0) motion vector, the second position is a predicted motion vector and the third position is a global motion vector.

60. The method of claim 55 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

61. The method of claim 55 wherein the smallest distance position is used to determine an appropriate motion vector which is used to stabilize an image.

62. A system for estimating motion, the system comprising:
   a. a memory for storing an application, the application configured for:
      i. determining a starting position comprising:
         (1) computing a distance value for each of a plurality of positions;
         (2) comparing the distance value of each of the plurality of positions; and (3) selecting a smallest starting distance position from the distance value of each of the plurality of positions; and
ii. iteratively searching for a smallest distance position starting from the starting position; and
b. a processor for processing the application.

63. The system of claim 62 wherein the distance value is a Sum of Absolute Differences value.

64. The system of claim 62 wherein iteratively searching further comprises:
a. setting a count to a specified value;
b. computing a sub-region distance value of a sub-region;
c. selecting a smallest regional distance value in the sub-region;
d. comparing the smallest regional distance value with a previous smallest regional distance value;
e. retaining a smaller regional distance value of the smallest regional distance value and the previous smallest regional distance value;
f. decrementing the count; and
g. repeating b-f until the count is zero.

65. The system of claim 62 wherein the plurality of positions includes a first position, a second position and a third position.

66. The system of claim 65 wherein the first position is a zero (0) motion vector, the second position is a predicted motion vector and the third position is a global motion vector.

67. The system of claim 62 wherein the processor and the memory are contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

68. The system of claim 62 wherein the smallest distance position is used to determine an appropriate motion vector which is used to stabilize an image.

69. An application for estimating motion processed by a processor, the application comprising:
a. a starting position component for determining a best starting position for starting an iterative search; and
b. an iterative search component for iteratively searching for a smallest distance position, wherein iteratively searching further comprises:
i. setting a count to a specified value;
ii. computing a distance value of a sub-region;
iii. selecting a smallest regional distance value in the sub-region;
iv. comparing the smallest regional distance value with a previous smallest regional distance value;
v. retaining a smaller regional distance value of the smallest regional distance value and the previous smallest regional distance value;
vi. decrementing the count; and
vii. repeating ii-vi until the count is zero.

70. The application of claim 69 wherein the application is contained within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod® and a home entertainment system.

71. The application of claim 69 wherein the smallest distance position is used to determine an appropriate motion vector which is used to stabilize an image.

72. An application for estimating motion processed by a processor, the application comprising:
a. a starting position component for determining a best starting position for starting an iterative search, wherein determining the best starting position includes:
i. computing a distance value for each of a plurality of positions;
ii. comparing the distance value of each of the plurality of positions; and
iii. selecting a smallest starting distance position from the distance value of each of the plurality of positions; and
b. an iterative search component for iteratively searching for a smallest distance position.

73. The application of claim 72 wherein the plurality of positions includes a first position, a second position and a third position.

74. The application of claim 73 wherein the first position is a zero (0) motion vector, the second position is a predicted motion vector and the third position is a global motion vector.

75. A method of improving motion estimation using a computing device, the method comprising:
a. determining a starting position comprising:
i. computing a distance value for each of a plurality of positions;
ii. comparing the distance value of each of the plurality of positions; and
iii. selecting a smallest starting distance position from the distance value of each of the plurality of positions;
b. iteratively searching for a smallest distance position starting from the starting position; and
c. avoiding a local minimum comprising:
i. determining a previous position;
ii. determining a new position;
iii. comparing the previous position and new position; and
iv. based on the previous position and the new position comparison, selecting a new search center, wherein the new search center is based on the previous position if the new position is in an opposite direction from the previous position and the new search center is based on the new position if the new position is not in the opposite direction from the previous position.

76. A method of improving motion estimation using a computing device, the method comprising:
a. determining a starting position comprising:
i. computing a distance value for each of a plurality of positions;
ii. comparing the distance value of each of the plurality of positions; and
iii. selecting a smallest starting distance position from the distance value of each of the plurality of positions;
b. iteratively searching for a smallest distance position starting from the starting position; and
c. determining a center point of a next search area comprising:
i. determining a position of a search area with a smallest distance search value;
ii. determining an offset for a center point of a next search area based on the position with the smallest distance search value; and
iii. selecting the center point of the next search area based on the offset.

77. A method of improving motion estimation using a computing device, the method comprising:
- a. determining a starting position comprising:
  - i. computing a distance value for each of a plurality of positions;
  - ii. comparing the distance value of each of the plurality of positions; and
  - iii. selecting a smallest starting distance position from the distance value of each of the plurality of positions;
- b. iteratively searching for a smallest distance position starting from the starting position;
- c. determining a center point of a next search area comprising:
  - i. determining a position of a search area with a smallest distance search value;
  - ii. determining an offset for a center point of a next search area based on the position with the smallest distance search value; and
  - iii. selecting the center point of the next search area based on the offset; and
- d. avoiding a local minimum comprising:
  - i. determining a previous position;
  - ii. determining a new position;
  - iii. comparing the previous position and new position; and
  - iv. based on the previous position and the new position comparison, selecting a new search center, wherein the new search center is based on the previous position if the new position is in an opposite direction from the previous position and the new search center is based on the new position if the new position is not in the opposite direction from the previous position.

78. A method of improving motion estimation using a computing device, the method comprising:
- a. determining a starting position comprising:
  - i. computing a distance value for each of a plurality of positions;
  - ii. comparing the distance value of each of the plurality of positions; and
  - iii, selecting a smallest starting distance position from the distance value of each of the plurality of positions;
- b. iteratively searching for a smallest distance position starting from the starting position;
- c. adding a motion vector cost to the smallest distance value of the smallest distance position to form a total cost;
- d. determining if a global motion vector is less than a threshold;
- e. if the global motion vector is less than the threshold, additional steps are taken, including:
  - i. comparing the total cost with a predictive motion vector distance value to determine a smaller value; and
  - ii. selecting the smaller value of the total cost and the predictive motion vector distance value for refinement;
- f. if the global motion vector is greater than or equal to the threshold, the smallest distance value of the smallest distance position is selected for refinement; and
- g. determining a center point of a next search area comprising:
  - i. determining a position of a search area with a smallest distance search value;
  - ii. determining an offset for a center point of a next search area based on the position with the smallest distance search value; and
  - iii. selecting the center point of the next search area based on the offset.

79. A method of improving motion estimation using a computing device, the method comprising:
- a. determining a starting position comprising:
  - i. computing a distance value for each of a plurality of positions;
  - ii. comparing the distance value of each of the plurality of positions; and
  - iii. selecting a smallest starting distance position from the distance value of each of the plurality of positions;
- b. iteratively searching for a smallest distance position starting from the starting position;
- c. adding a motion vector cost to the smallest distance value of the smallest distance position to form a total cost;
- d. determining if a global motion vector is less than a threshold;
- e. if the global motion vector is less than the threshold, additional steps are taken, including:
  - i. comparing the total cost with a predictive motion vector distance value to determine a smaller value; and
  - ii. selecting the smaller value of the total cost and the predictive motion vector distance value for refinement;
- f. if the global motion vector is greater than or equal to the threshold, the smallest distance value of the smallest distance position is selected for refinement; and
- g. avoiding a local minimum comprising:
  - i. determining a previous position;
  - ii. determining a new position;
  - iii. comparing the previous position and new position; and
  - iv. based on the previous position and the new position comparison, selecting a new search center, wherein the new search center is based on the previous position if the new position is in an opposite direction from the previous position and the new search center is based on the new position if the new position is not in the opposite direction from the previous position.

80. A method of improving motion estimation using a computing device, the method comprising:
- a. determining a starting position comprising:
  - i. computing a distance value for each of a plurality of positions;
  - ii. comparing the distance value of each of the plurality of positions; and
  - iii. selecting a smallest starting distance position from the distance value of each of the plurality of positions;
- b. iteratively searching for a smallest distance position starting from the starting position;
- c. adding a motion vector cost to the smallest distance value of the smallest distance position to form a total cost;
- d. determining if a global motion vector is less than a threshold;
- e. if the global motion vector is less than the threshold, additional steps are taken, including:
  - i. comparing the total cost with a predictive motion vector distance value to determine a smaller value; and
  - ii. selecting the smaller value of the total cost and the predictive motion vector distance value for refinement; and
- f. if the global motion vector is greater than or equal to the threshold, the smallest distance value of the smallest distance position is selected for refinement; and
- g. determining a center point of a next search area comprising:

i. determining a position of a search area with the smallest distance search value;
ii. determining an offset for a center point of a next search area based on the position with the smallest distance search value; and
iii. selecting the center point of the next search area based on the offset; and
h. avoiding a local minimum comprising:
i. determining a previous position;
ii. determining a new position;
iii. comparing the previous position and new position; and
iv. based on the previous position and the new position comparison, selecting a new search center, wherein the new search center is based on the previous position if the new position is in an opposite direction from the previous position and the new search center is based on the new position if the new position is not in the opposite direction from the previous position.

81. A method of improving motion estimation using a computing device, the method comprising:
a. determining a starting position comprising:
i. computing a distance value for each of a plurality of positions;
ii. comparing the distance value of each of the plurality of positions; and
iii. selecting a smallest starting distance position from the distance value of each of the plurality of positions;
b. iteratively searching for a smallest distance position starting from the starting position;
c. adding a motion vector cost to the smallest distance value of the smallest distance position to form a total cost;
d. determining if a global motion vector is less than a threshold;
e. if the global motion vector is less than the threshold, additional steps are taken, including:
i. comparing the total cost with a predictive motion vector distance value to determine a smaller value; and
ii. selecting the smaller value of the total cost and the predictive motion vector distance value for refinement;
f. if the global motion vector is greater than or equal to the threshold, the smallest distance value of the smallest distance position is selected for refinement; and
g. determining a center point of a next search area comprising:
i. determining a position of a search area with the smallest distance search value;
ii. determining an offset for a center point of a next search area based on the position with the smallest distance search value; and
iii. selecting the center point of the next search area based on the offset;
h. avoiding a local minimum comprising:
i. determining a previous position;
ii. determining a new position;
iii. comparing the previous position and new position; and
iv. based on the previous position and the new position comparison, selecting a new search center, wherein the new search center is based on the previous position if the new position is in an opposite direction from the previous position and the new search center is based on the new position if the new position is not in the opposite direction from the previous position; and
i. terminating iteratively searching early comprising:
i. computing a sub-region distance value of a sub-region;
ii. determining a minimum distance value of the sub-region;
iii. comparing the minimum distance value with a threshold;
iv. ending prematurely, if the minimum distance value is less than the threshold; and
v. repeating i-iv until the count is zero, if the minimum distance value is greater than or equal to the threshold.

* * * * *

UNITED STATES PATENT AND TRADEMARK OFFICE
CERTIFICATE OF CORRECTION

PATENT NO. : 8,094,714 B2
APPLICATION NO. : 12/218656
DATED : January 10, 2012
INVENTOR(S) : Munehiro Nakazato and Sung-Yul Koo It is certified that error appears in the above-identified patent and that said Letters Patent is hereby corrected as shown below:

IN THE DRAWINGS

Please replace Figure 12 and Figure 13 with those as shown below.

Fig. 12

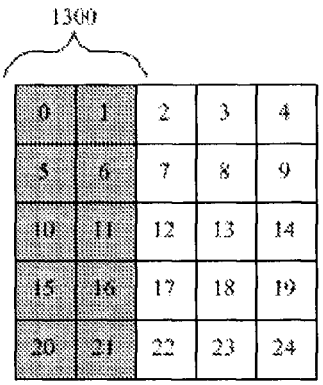

Fig. 13

Signed and Sealed this
Tenth Day of April, 2012

David J. Kappos
*Director of the United States Patent and Trademark Office*